US012559035B2

(12) United States Patent
Kaddouh et al.

(10) Patent No.: US 12,559,035 B2
(45) Date of Patent: Feb. 24, 2026

(54) LADDER ASSEMBLIES FOR VEHICLES

(71) Applicant: Nissan North America, Inc., Franklin, TN (US)

(72) Inventors: Sam Kaddouh, West Bloomfield, MI (US); James Adams, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 711 days.

(21) Appl. No.: 17/855,733

(22) Filed: Jun. 30, 2022

(65) Prior Publication Data

US 2024/0001852 A1 Jan. 4, 2024

(51) Int. Cl.
*B60R 3/00* (2006.01)

(52) U.S. Cl.
CPC .................................... *B60R 3/005* (2013.01)

(58) Field of Classification Search
CPC ... E06C 5/24; E06C 1/125; E06C 9/14; B63B 27/146; B60R 3/005; B60R 3/007
USPC .......................................................... 182/195
See application file for complete search history.

(56) References Cited

U.S. PATENT DOCUMENTS

| | | | | |
|---|---|---|---|---|
| 2,485,413 | A | 10/1949 | Ross | |
| 4,236,601 | A * | 12/1980 | Naka | E06C 9/02 |
| | | | | 182/100 |
| 5,752,580 | A * | 5/1998 | Jenkins, Jr. | E06C 1/34 |
| | | | | 182/100 |

| | | | | |
|---|---|---|---|---|
| 6,904,863 | B2 * | 6/2005 | Mardikian | E06C 5/04 |
| | | | | 114/362 |
| 8,182,013 | B1 * | 5/2012 | Alvarado | B60R 3/007 |
| | | | | 182/127 |
| 9,506,292 | B2 | 11/2016 | Levi | |
| 10,836,321 | B1 * | 11/2020 | Clark | B60R 3/007 |
| 10,843,631 | B1 * | 11/2020 | Honeysett | B60R 3/02 |
| 11,673,629 | B1 * | 6/2023 | Rogachenko | B63B 27/146 |
| | | | | 114/362 |
| 2008/0000723 | A1 * | 1/2008 | Kieffer | E06C 1/125 |
| | | | | 182/195 |
| 2008/0277199 | A1 | 11/2008 | Castonguay | |
| 2010/0012433 | A1 * | 1/2010 | Ross | E06C 1/125 |
| | | | | 182/211 |
| 2010/0258379 | A1 * | 10/2010 | Mickens | E06C 1/125 |
| | | | | 182/195 |

(Continued)

FOREIGN PATENT DOCUMENTS

| | | |
|---|---|---|
| DE | 102014018553 A1 | 6/2016 |
| WO | 2021/004967 A1 | 1/2021 |

*Primary Examiner* — Noah Chandler Hawk
(74) *Attorney, Agent, or Firm* — Young Basile Hanlon & MacFarlane, P.C.

(57) ABSTRACT

A ladder assembly is disclosed that is configured for use with a vehicle. The ladder assembly includes a case and a ladder defining a longitudinal axis. The case include at least one engagement member that is configured for releasable engagement with the vehicle such that the ladder assembly is removably connectable thereto. The ladder is reconfigurable between a collapsed configuration and an expanded configuration and is pivotably connected to the case to allow for adjustment in an angular orientation of the ladder. In certain embodiments, the ladder assembly may further include one or more locking mechanisms that are configured to fix the angular orientation and/or the vertical position of the ladder.

20 Claims, 16 Drawing Sheets

(56) References Cited

U.S. PATENT DOCUMENTS

2014/0261145 A1 *   9/2014  Neese ..................... B63B 27/14
                                                    114/362
2018/0044985 A1 *   2/2018  Orscheln ................... B60R 3/02
2018/0290596 A1 *  10/2018  Fukushima ............. B60R 3/005
2022/0289112 A1 *   9/2022  Parack ..................... E06C 5/04

* cited by examiner

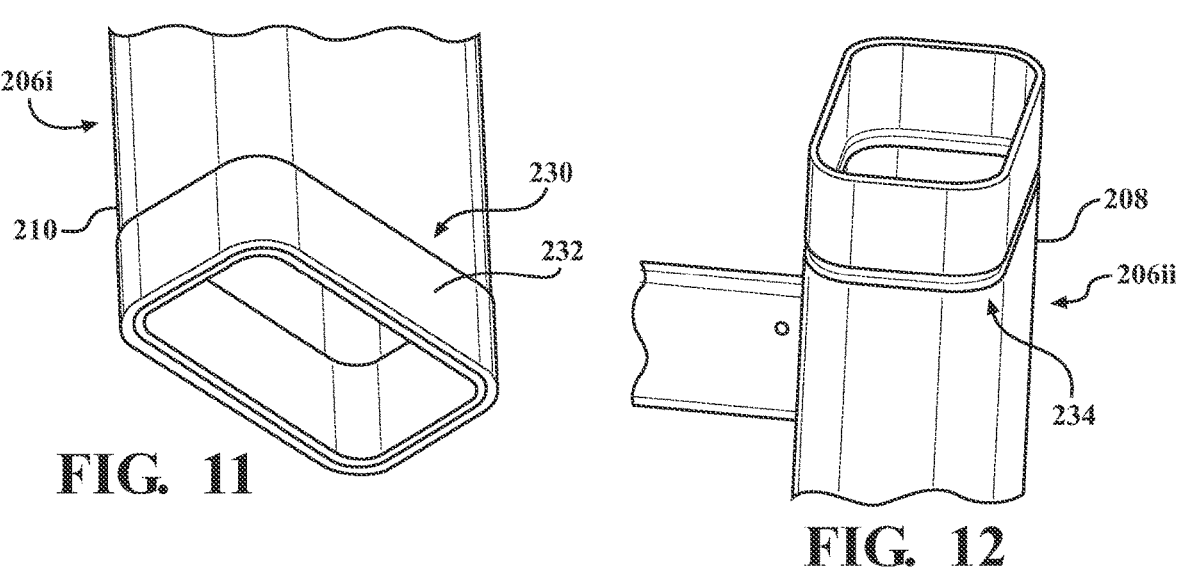
FIG. 11
FIG. 12
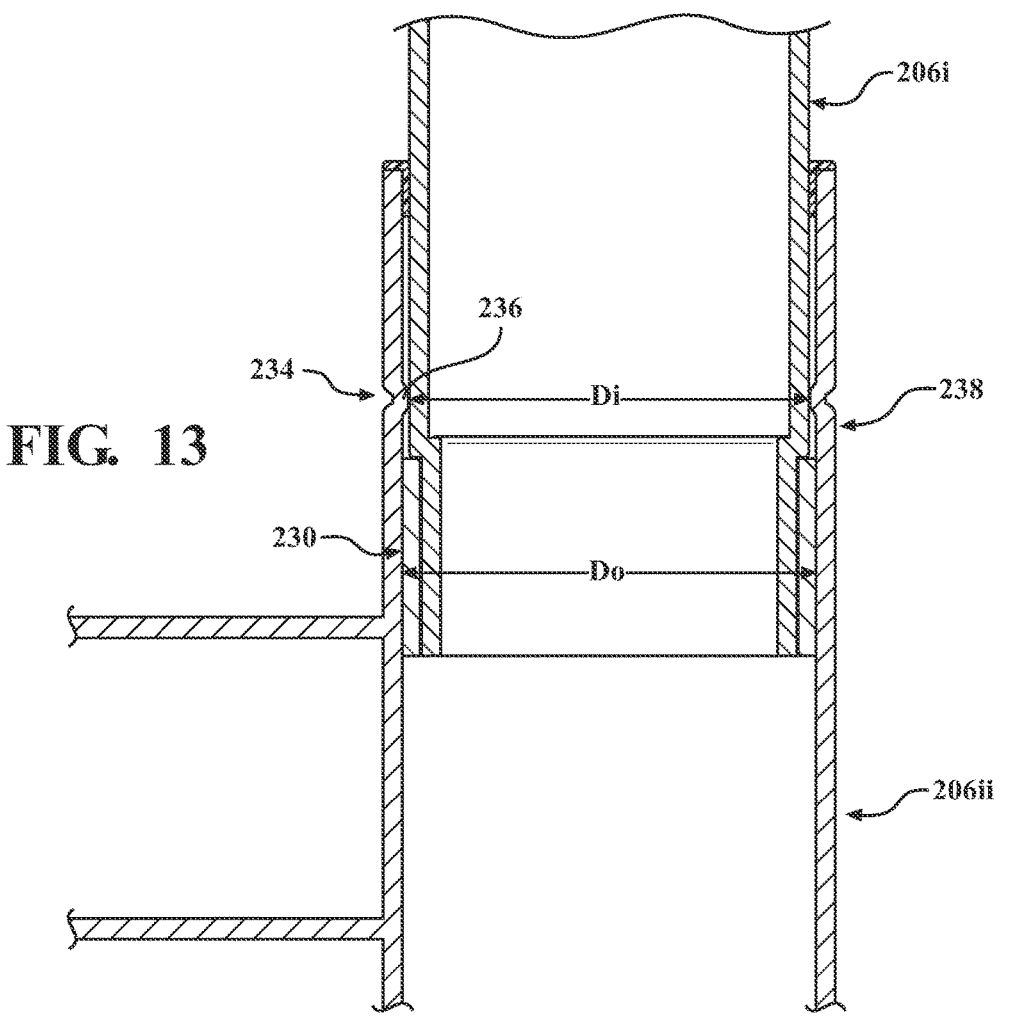
FIG. 13

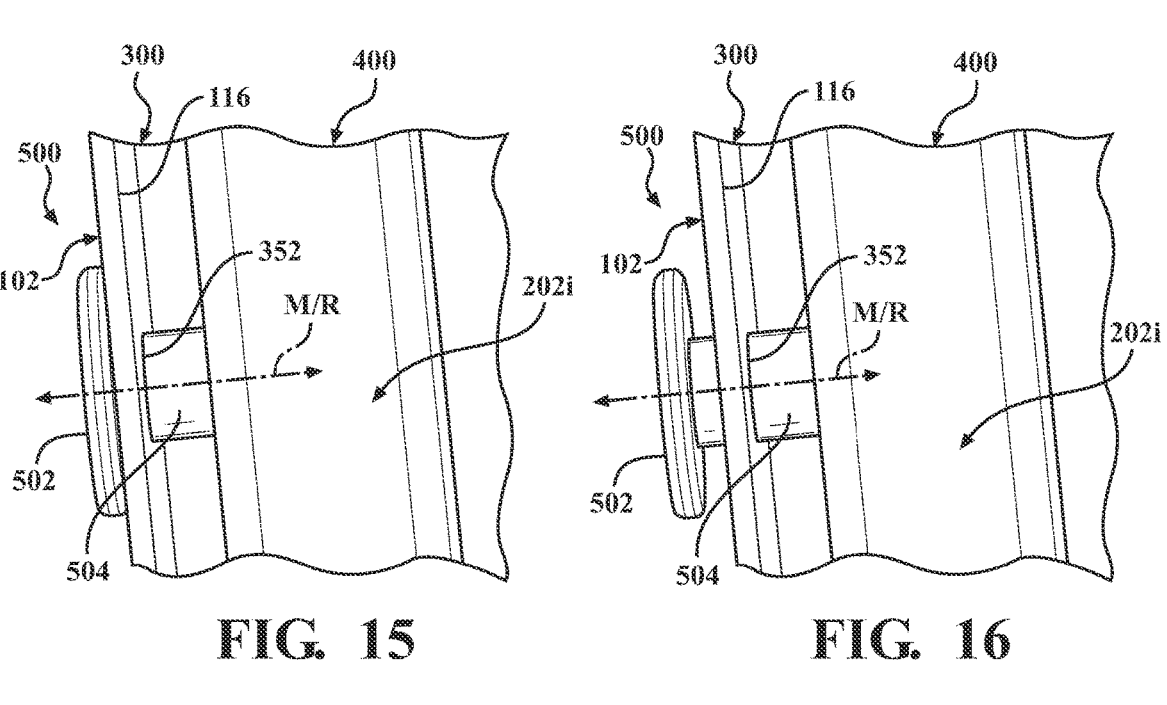
FIG. 15           FIG. 16
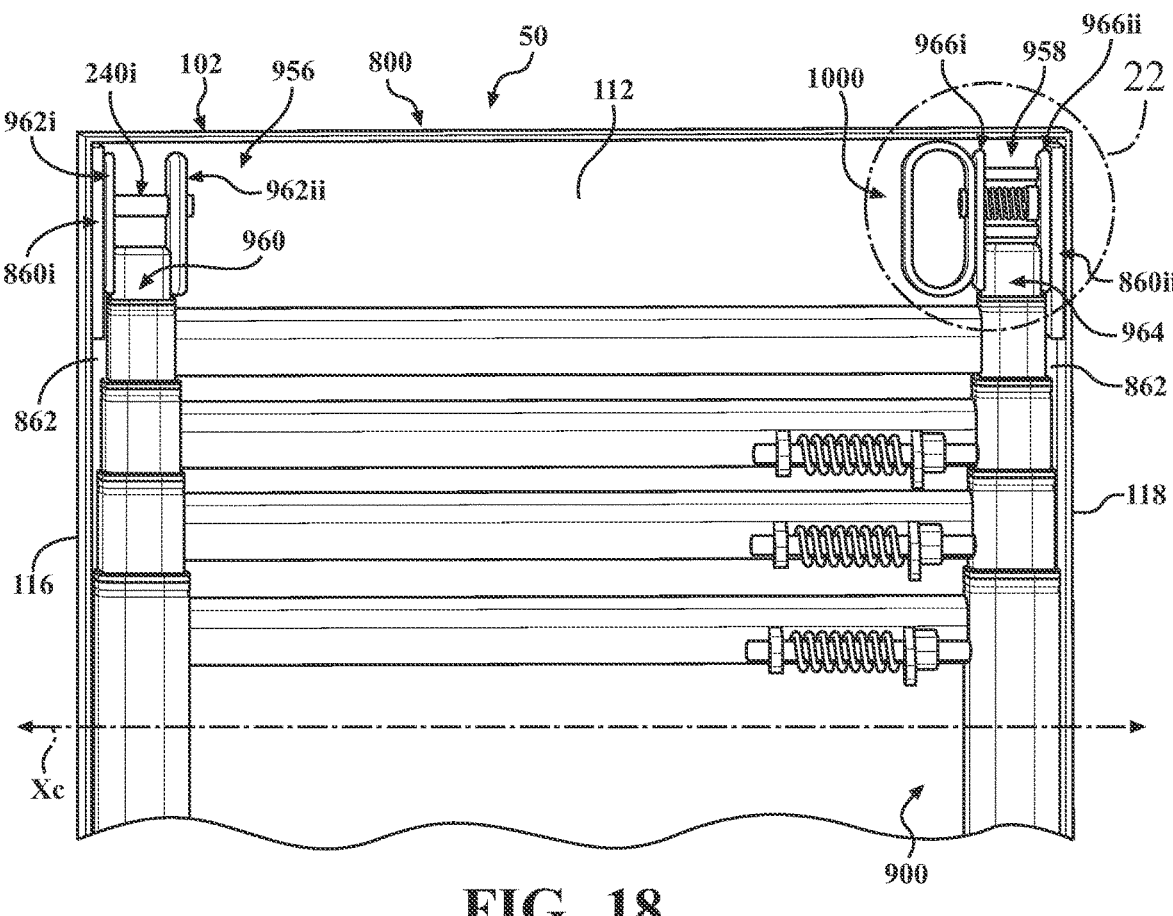
FIG. 18

LADDER ASSEMBLIES FOR VEHICLES

TECHNICAL FIELD

The present disclosure relates to a ladder assembly that is configured for releasable engagement with (removable connection to) a vehicle to facilitate access to various areas thereof, including, for example, the roof section of the vehicle.

BACKGROUND

Often times, it is necessary or desirable to access the roof section of a vehicle (e.g., when loading and unloading the roof rack or other such storage-related accessory). While certain efforts have been made to develop ladder assemblies for vehicles, known ladder assemblies are typically connected to the vehicle in a permanent manner or, when removable, are cumbersome to install, remove, and stow due to their size and functionality.

The present disclosure addresses these deficiencies, among others, and describes ladder assemblies that not only simplify installation and removal, but stowage and use as well.

SUMMARY

In one aspect of the present disclosure, a ladder assembly is disclosed that is configured for use with a vehicle. The ladder assembly includes a case and a ladder defining a longitudinal axis. The case include at least one engagement member that is configured for releasable engagement with the vehicle such that the ladder assembly is removably connectable thereto. The ladder is reconfigurable between a collapsed configuration and an expanded configuration and is pivotably connected to the case to allow for adjustment in an angular orientation of the ladder.

In certain embodiments, the case may include a housing and a cover that is connected to the housing.

In certain embodiments, the ladder assembly may further include pivot members that extend transversely in relation to the longitudinal axis and which pivotably connect the case and the ladder.

In certain embodiments, the case may define an internal cavity that is configured to receive the ladder.

In certain embodiments, the ladder assembly may be reconfigurable between a storage configuration, in which the ladder is located within the internal cavity, and a use configuration, in which the ladder extends from the internal cavity to facilitate reconfiguration of the ladder from the collapsed configuration into the expanded configuration.

In certain embodiments, the ladder may be configured for automatic reconfiguration from the collapsed configuration into the expanded configuration upon extension of the ladder from the internal cavity.

In certain embodiments, the ladder may be configured for manual reconfiguration from the collapsed configuration into the expanded configuration.

In certain embodiments, the ladder may include a first segment and a second segment that are configured for relative axial movement along the longitudinal axis and a latch that is supported on the first segment.

In certain embodiments, the latch may be reconfigurable between an engaged position, in which latch engages the second segment so as to maintain relative axial positioning of the first segment and the second segment, and a disengaged position, in which the latch is disengaged from the second segment so as to permit relative axial movement between the first segment and the second segment.

In another aspect of the present disclosure, a ladder assembly is disclosed that is configured for use with a vehicle. The ladder assembly includes: a case that is configured for releasable engagement with the vehicle; a locking mechanism that is supported by the case; and a ladder. The ladder defines a longitudinal axis as well as a locking groove that is configured to receive the locking mechanism and is telescopically reconfigurable between a collapsed configuration and an expanded configuration.

In certain embodiments, the ladder assembly may include a pair of locking mechanisms and a pair of locking grooves.

In certain embodiments, the locking mechanism may be repositionable between an unlocked position, in which the locking mechanism is separated from the locking groove such that the ladder is movable in relation to the case, and a locked position, in which the locking mechanism is positioned within the locking groove to inhibit movement of the ladder in relation to the case.

In certain embodiments, the locking mechanism may be slidably repositionable between the unlocked position and the locked position along an axis of movement that extends in transverse relation to the longitudinal axis.

In certain embodiments, the locking mechanism may be rotatable about an axis of rotation that extends in transverse relation to the longitudinal axis and in generally parallel relation to the axis of movement.

In certain embodiments, the locking groove may include a channel that extends in generally parallel relation to the longitudinal axis and a slot that extends transversely in relation to the channel.

In certain embodiments, the slot may be configured to receive an anchor of the locking mechanism.

In certain embodiments, the slot may extend along an axis that subtends an angle with the longitudinal axis that lies substantially within the range of approximately 5 degrees to approximately 45 degrees.

In another aspect of the present disclosure, a ladder assembly is disclosed that is configured for use with a vehicle. The ladder assembly includes: a case; a ladder that is pivotably connected to the case; and a locking mechanism that is repositionable between a locked configuration, in which the locking mechanism extends through the ladder and into the case to thereby fix an angular orientation of the ladder, and an unlocked configuration, in which the locking mechanism is separated from the case to allow for adjustment of the angular orientation of the ladder.

In certain embodiments, the ladder assembly may further include a first pivot member and a second pivot member that pivotably connect the case and the ladder to facilitate adjustment of the angular orientation of the ladder.

In certain embodiments, the second pivot member may extend into the locking mechanism.

In certain embodiments, the locking mechanism may be biased towards the locked configuration.

In certain embodiments, the case may include a first locking aperture that is configured to receive the locking mechanism and thereby fix the ladder in a first angular orientation and a second locking aperture that is configured to receive the locking mechanism and thereby fix the ladder in a second angular orientation.

In certain embodiments, the locking mechanism may include a locking pin that is configured for removable insertion into the first locking aperture and the second locking aperture.

In certain embodiments, the second locking aperture may be angularly offset from the first locking aperture by an angular distance that lies substantially within the range of approximately 5 degrees to approximately 45 degrees.

BRIEF DESCRIPTION OF THE DRAWINGS

According to common practice, the various features of the drawings may not be to scale and may be arbitrarily expanded or reduced for clarity.

FIG. 11 is a bottom, perspective view of a segment of the ladder illustrating a restrictor.

FIG. 12 is a top, perspective view of a segment of the ladder located adjacent to the segment seen in FIG. 11 and including an indentation configured for engagement (contact) with the restrictor so as to define a hard stop.

FIG. 13 is a partial, vertical, cross-sectional view of the ladder taken through the restrictor seen in FIG. 11 and through the indentation seen in FIG. 12.

FIG. 15 is a partial, side, perspective view of the ladder assembly seen in FIG. 14 with the locking mechanism shown in an unlocked position.

FIG. 16 is a partial, side, perspective view of the ladder assembly seen in FIG. 14 with the locking mechanism shown in a locked position.

FIG. 18 is a partial, front, plan view of the ladder assembly according to an alternate embodiment of the disclosure, which includes a case, an expandable ladder, and a (spring-biased) locking mechanism.

DETAILED DESCRIPTION

In one embodiment of the present disclosure, a ladder assembly is disclosed that is releasably engageable with (connectable to) a vehicle to provide access to the roof section and other such areas thereof. The ladder assembly includes a case and a telescopically expandable, segmented ladder that is pivotably connected to the case. Pivotably connecting the case and the ladder allows for reconfiguration of the ladder assembly between a storage (closed) configuration, in which the ladder 200 is stowed within the case, and a use (open) configuration, in which the ladder extends from the case so as to facilitate deployment (expansion) of the ladder, as well as adjustment in an angular orientation of the ladder.

In certain embodiments of the disclosure, the ladder assembly further includes one or more locking mechanisms that are configured to fix the angular orientation and/or the vertical position of the ladder. For example, in one embodiment, the ladder includes a pair of locking mechanisms that are releasably engageable with (insertable into) corresponding locking grooves defined by the ladder, whereas in another embodiment, the ladder includes a spring-biased locking mechanism that extends through the ladder and into the case to thereby fix (secure) the ladder in a variety of angular orientations.

Figures 1, 2:
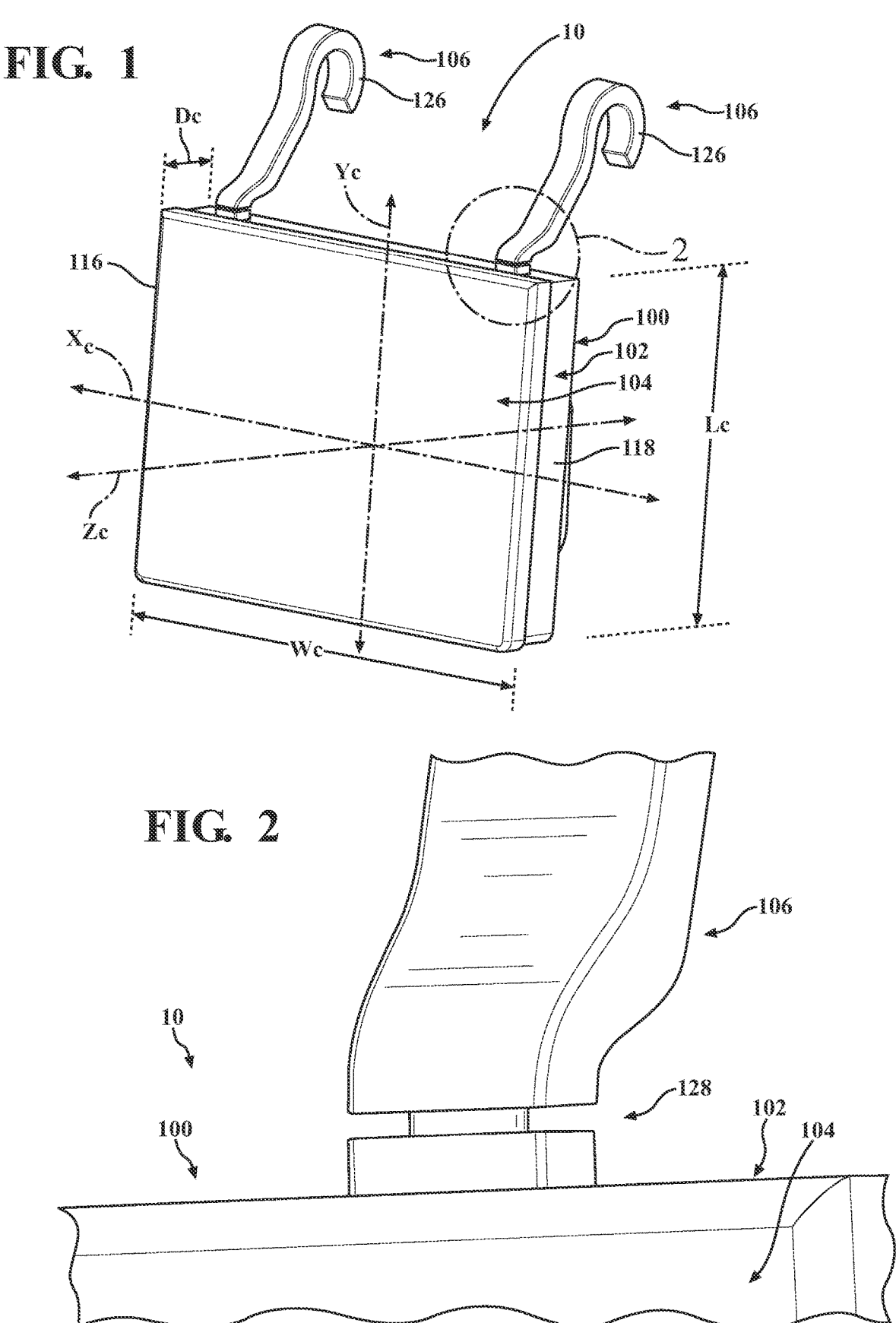
FIG. 1 is a front, perspective view of a ladder assembly according to one embodiment of the present disclosure, which includes a case, an expandable ladder, and a locking mechanism, shown in a storage configuration.
FIG. 2 is an enlargement of the area of detail identified in FIG. 1.
Figure 3:
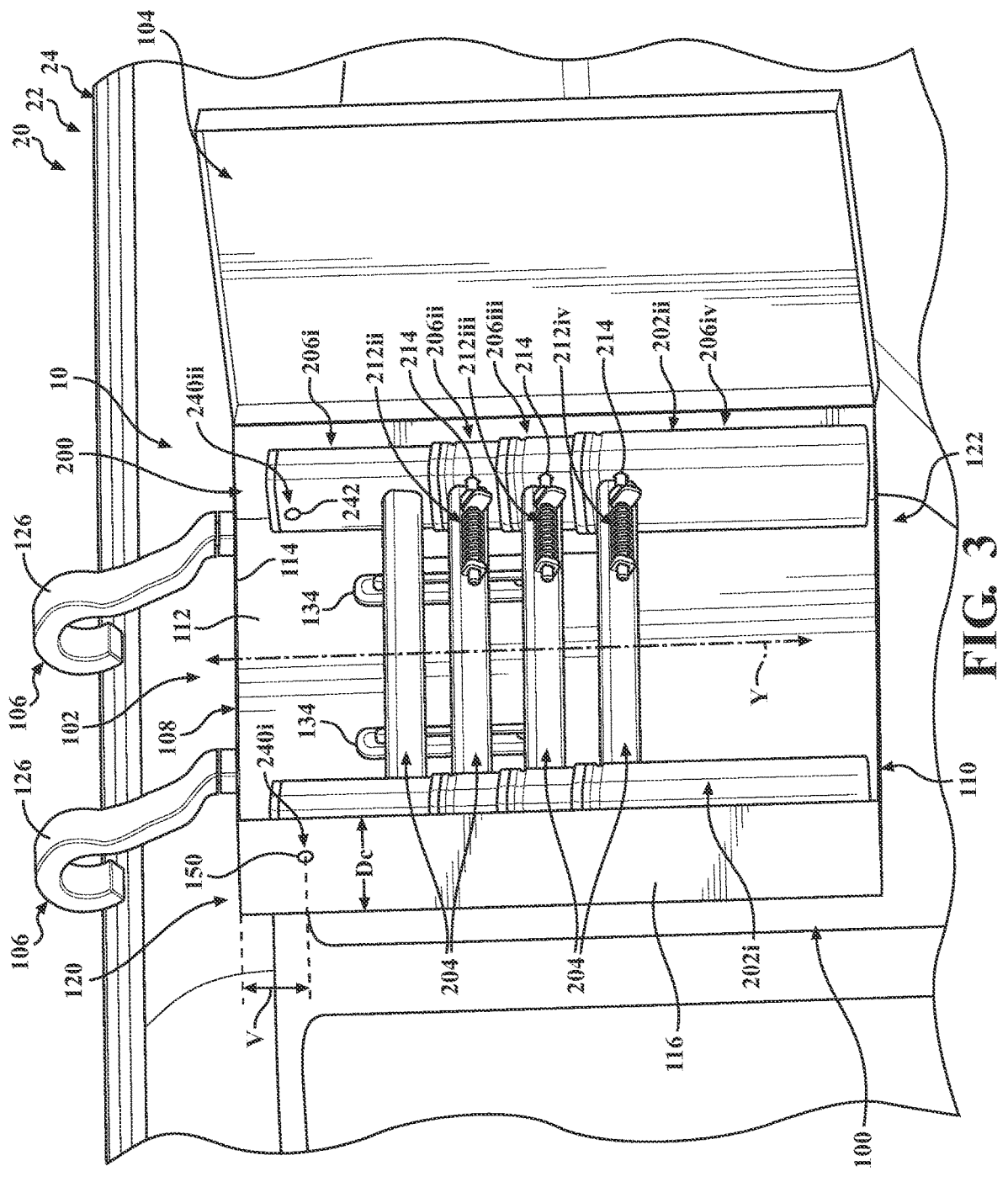
FIG. 3 is a front, perspective view of the ladder assembly upon connection to a vehicle with the ladder shown in a collapsed configuration.
Figure 4:
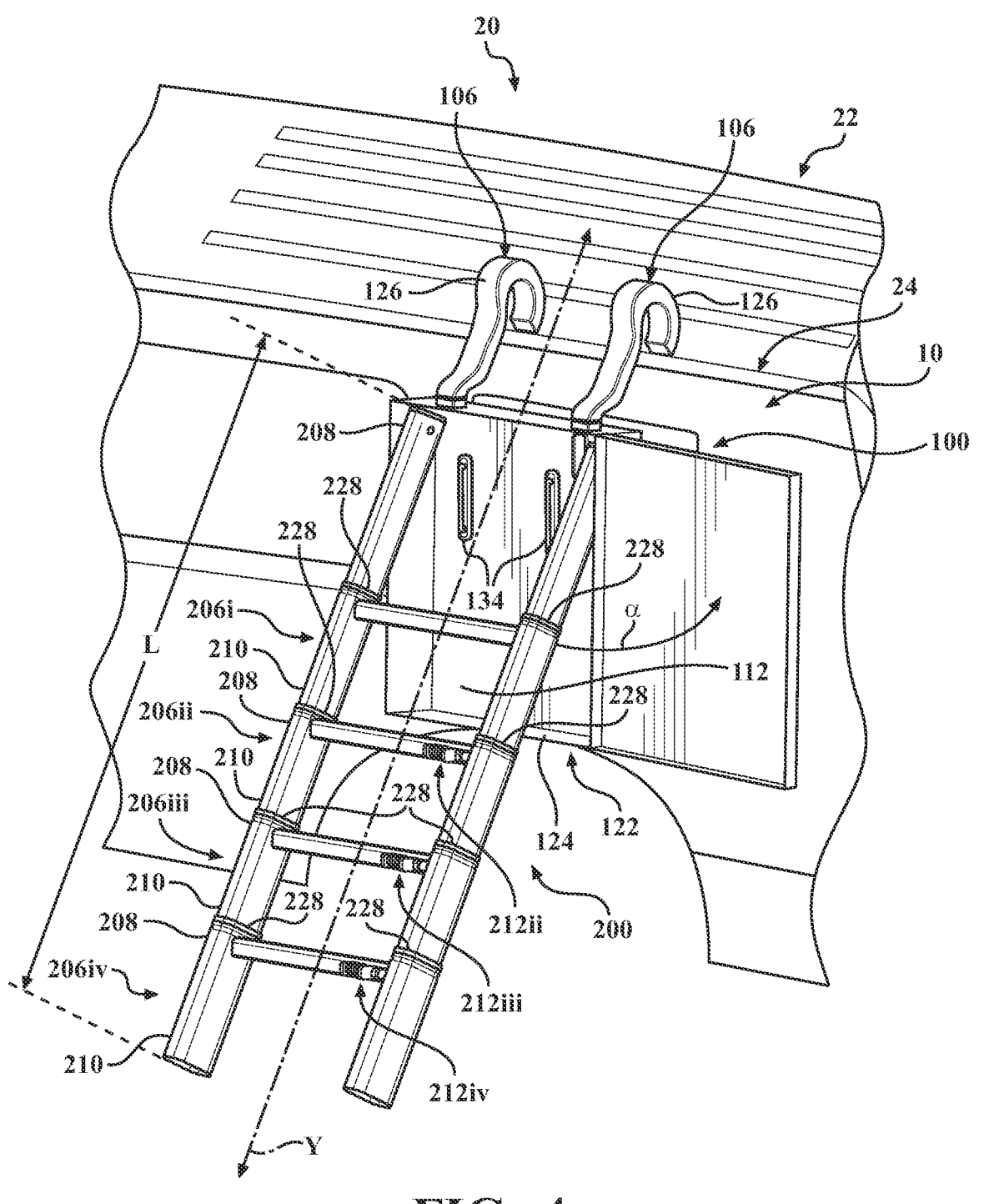
FIG. 4 is a front, perspective view of the ladder assembly shown in a use configuration with the ladder shown in an expanded configuration.

With reference to FIGS. 1-13, a ladder assembly 10 is illustrated that is configured for releasable engagement with (removable connection to) a vehicle 20 to improve access to various areas of the vehicle 20 including, for example, a roof section 22 thereof. The ladder assembly 10 includes a case 100 and an expandable ladder 200 that is reconfigurable between a collapsed configuration (FIG. 3) and an expanded configuration (FIG. 4). Although illustrated and described in the context of a passenger vehicle, it should be appreciated that the principles of the present disclosure are equally applicable to a variety of vehicles (e.g., trucks, SUVs, vans, boats, airplanes, trains, etc.).

The case 100 defines a length (height) Lc that extends along a first (longitudinal) axis Yc, a width Wc that extends along a second axis Xc, and a depth (thickness) Dc that extends along a third axis Zc, and includes: a housing (body) 102; a cover (lid) 104; and one or more engagement members 106. Although illustrated as including (e.g., as being formed partially or entirely from) a metallic material (e.g., aluminum, stainless steel, etc.) in the particular embodiment illustrated, it is envisioned that the case 100 may include any suitable material or combination of materials, whether metallic or non-metallic. For example, embodiments are also envisioned in which the case 100 may include (e.g., may be formed partially or entirely from) one or more plastic materials, polymeric materials, composite materials (e.g., carbon fiber), etc.

The housing 102 includes respective upper and lower ends 108, 110 and defines an internal cavity 112 (FIGS. 3, 4) that is configured to receive (accommodate) the ladder 200 in the collapsed configuration. As seen in FIG. 3, the housing 102 includes an upper end wall 114 and sidewalls 116, 118 that extend (vertically) therefrom, whereby the case 100 includes a closed upper end 120 and an open lower end 122 (FIG. 3). As discussed in further detail below, the open lower end 122 of the case 100 allows for automatic expansion of the ladder 200 upon opening (or removal) of the cover 104. Embodiments in which the lower end 122 may be closed by a lower end wall 124 are also envisioned herein, however, as seen in FIG. 4, which allows the ladder 200 to remain in the collapsed configuration until the ladder 200 is pivoted outwardly (e.g., away from the vehicle 20) and removed from the internal cavity 112.

The cover 104 conceals the internal cavity 112 and the ladder 200 (when the ladder 200 is in the collapsed configuration) and is connected to the housing 102 such that the ladder assembly 10 is reconfigurable between a storage (closed) configuration (FIGS. 1, 3) (e.g., during non-use), in which the ladder 200 is located within the internal cavity 112 so as to facilitate stowing and/or transport of the ladder assembly 10, and a use (open) configuration (FIG. 4), in which the ladder 200 extends from the internal cavity 112 so as to facilitate deployment (e.g., reconfiguration of the ladder 200 from the collapsed configuration into the expanded configuration).

In the particular embodiment of the ladder assembly 10 illustrated, the cover 104 is hingedly and non-removably connected to the housing 102. Embodiments are also envisioned, however, in which the cover 104 may be removably engageable with (connectable to) the housing 102. For example, embodiments are envisioned in which the cover 104 may be engageable with (connectable to) the housing 102 via one or more mechanical fasteners (e.g., thumb screws, pins, clips, clasps, etc.) as are embodiments in which the cover 104 and the housing 102 may be configured for engagement (connection) in an interference (press) fit arrangement (e.g., via one or more corresponding detents and recesses).

The engagement member(s) 106 extend from the housing 102 and are configured for releasable engagement with the vehicle 20 such that the ladder assembly 10 is removably connectable thereto. For example, in the particular embodiment illustrated, each engagement member 106 includes a hook 126 that is configured for releasable engagement with (connection to) a roof rack 24 on the roof section 22 of the vehicle 20. The configuration of the engagement member(s)

106 not only simplifies installation (connection) and removal (disconnection) of the ladder assembly 10, but allows for slidable relocation of the ladder assembly 10 along the roof rack 24.

In certain embodiments of the disclosure, it is envisioned that the engagement member(s) 106 may be movably connected to the housing 102 (e.g., to facilitate installation and removal of the ladder assembly 10, increase the overall utility of the ladder assembly 10, etc.). For example, in the particular embodiment illustrated, the engagement member(s) 106 are connected to the housing 102 via a ball-and-socket assembly 128 (FIG. 2), which allows for relative movement (e.g., pivoting, rotation) between the engagement member(s) 106 and the housing 102. Embodiments in which the engagement member(s) 106 and the housing 102 may be fixedly (e.g., non-movably) connected are also envisioned herein, however, and would not be beyond the scope of the present disclosure.

In the particular embodiment illustrated, the ladder assembly 10 includes two engagement members 106. It should be appreciated, however, that the particular number of engagement members 106 may be altered in various embodiments without departing from the scope of the present disclosure (e.g., depending upon the size of the ladder assembly 10, the style of the vehicle 20, the location of the point of engagement (connection) between the ladder assembly 10 and the vehicle 20, etc.). As such, embodiments of the ladder assembly 10 including both greater and fewer numbers of engagement members 106 are also contemplated herein and would not be beyond the scope of the present disclosure.

Figure 5:
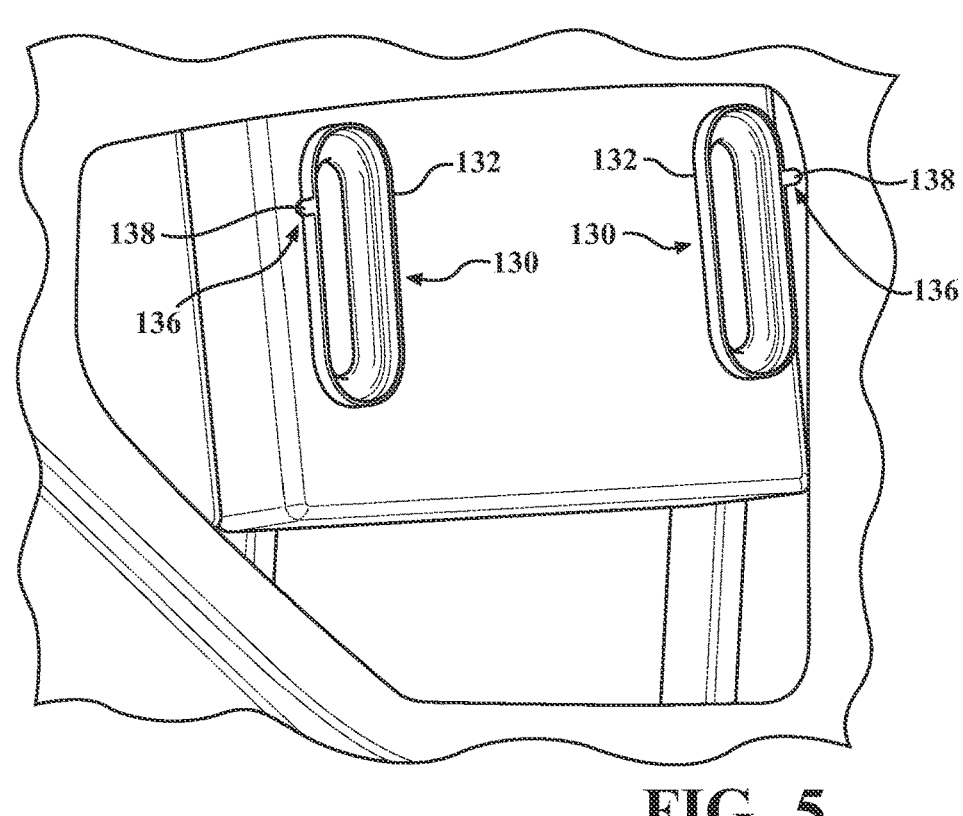
FIG. 5 is a partial, rear, perspective view of the case illustrating securement members configured to inhibit relative movement between the ladder assembly and the vehicle according to one embodiment of the disclosure.
Figure 6:
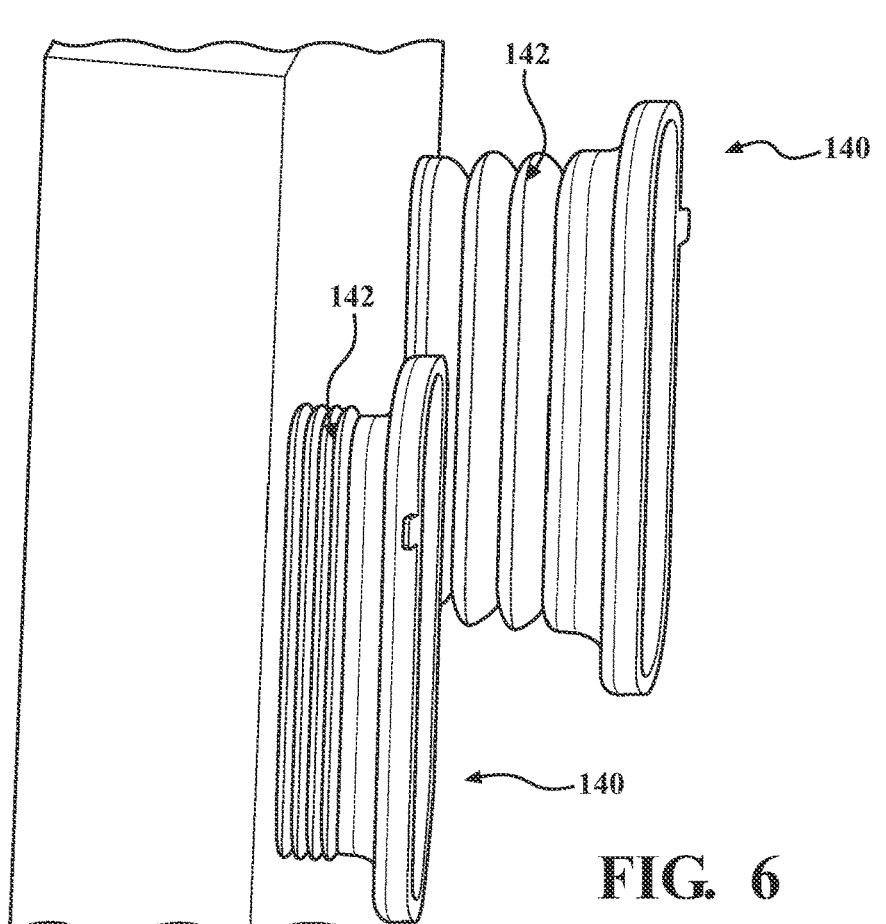
FIG. 6 is a partial, side, perspective view of the case including an alternate embodiment of the securement members seen in FIG. 5.
Figure 7:
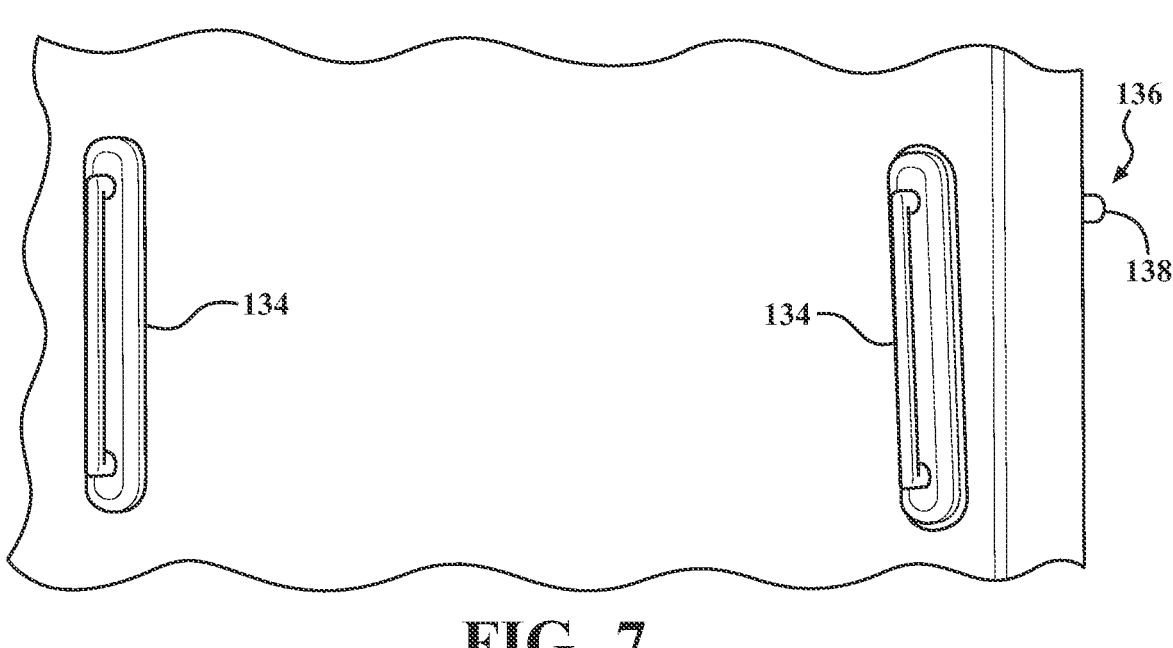
FIG. 7 is a partial, front, perspective view of the case (with the ladder removed) illustrating handles used to secure the ladder assembly to the vehicle.

As seen in FIGS. 5 and 6, in certain embodiments of the disclosure, it is envisioned that the ladder assembly 10 may include one or more securement members 130 that are configured to inhibit (if not entirely prevent) movement of the ladder assembly 10 in relation to the vehicle 20 (e.g., the roof rack 24) upon installation and, thus, improve stability of the ladder assembly 10. The securement member(s) 130 are supported by (e.g., connected to) the case 100 (e.g., the housing 102) and, in the particular embodiment illustrated, are configured as suction cups 132. To facilitate and improve connection and disconnection of the securement member(s) 130 and the vehicle 20, it is envisioned that the case 100 may include one or more handles 134 (FIGS. 3, 4, 7), which allow for the application of force to the ladder assembly 10. More specifically, during installation of the ladder assembly 10, the handle(s) 134 allow for the (manual) application of a pushing force that is directed inwardly (e.g., towards the vehicle 20), and during removal of the ladder assembly 10, the handle(s) 134 allow for the (manual) application of a pulling force that is directed outwardly (e.g., away from the vehicle 20).

To facilitate disconnection of the securement member(s) 130, it is envisioned that the ladder assembly 10 may include one or more relief members 136 that can be utilized to release the vacuum(s) created by the securement members(s) 130 upon connection to the vehicle 20. For example, in the particular embodiment illustrated, the relief members 136 are configured as tabs 138 that are provided on each of the securement members 130 so as to facilitate the (manual) application of a pulling force to the securement member(s) 130. Additionally, or alternatively, it is envisioned that the case 100 may include one or more release valves (or the like) to allow for the introduction of air into the securement member(s) 130 and, thus, disconnection of the securement member(s) 130 from the vehicle 20.

Although shown as including two securement members 130 in the embodiment illustrated, it should be appreciated that the number of securement members 130 may be altered in various embodiments without departing from the scope of the present disclosure (e.g., depending upon the size of the ladder assembly 10, the style of the vehicle 20, the location of the point of engagement (connection) between the ladder assembly 10 and the vehicle 20, etc.). As such, embodiments of the ladder assembly 10 including both greater and fewer numbers of securement members 130 are also contemplated herein and would not be beyond the scope of the present disclosure.

In the particular embodiment illustrated in FIG. 5, the securement members 130 include a fixed configuration. FIG. 6 illustrates securement members 140, which are an alternate embodiment of the securement members 130. The securement members 140 are adjustable, which allows for connection (attachment) to offset surfaces of the vehicle 20 that lie in different (vertical) planes. While the securement members 140 are each shown as including a body 142 with a bellows (accordion) style construction, it should be appreciated that the securement member(s) 140 may include any configuration suitable for the intended purpose of facilitating reconfiguration (e.g., expansion and contraction), or other such adjustment, of the securement member(s) 140 and positioning of the ladder assembly 10 in multiple locations on the vehicle via connection (attachment) to a variety of surfaces. For example, it is envisioned that one securement member 140 may be connected (attached) to a window of the vehicle 20 and that another securement member 140 may be connected (attached) to a door or a body panel of the vehicle 20.

Figure 8:
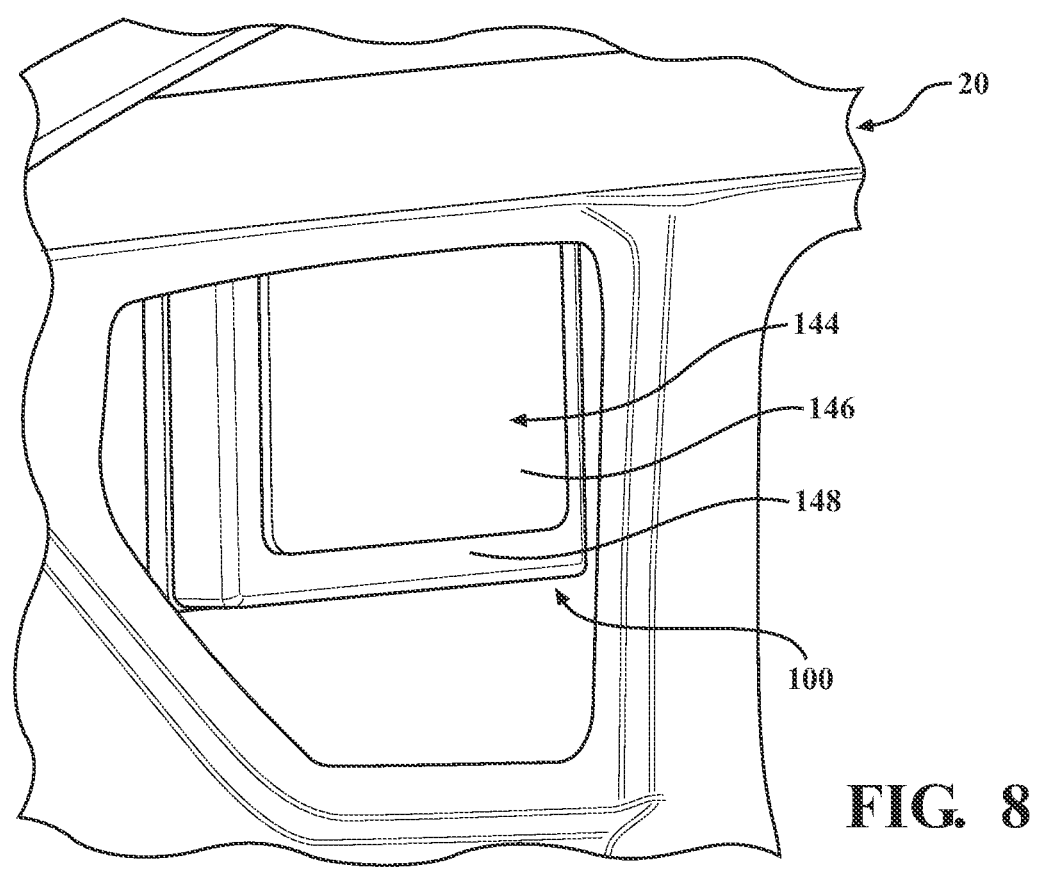
FIG. 8 is a partial, rear, perspective view of the case illustrating a protective member used to protect the vehicle according to one embodiment of the disclosure.

With reference now to FIG. 8, in certain embodiments of the disclosure, it is envisioned that the ladder assembly 10 may include one or more protective members 144 to inhibit (if not entirely prevent) damage to the vehicle 20 (e.g., scratches, dents, etc.) during installation and/or removal of the ladder assembly 10. In the particular embodiment illustrated, the ladder assembly 10 includes a single protective member 144 configured as a pad 146 that is provided on a rear surface 148 of the housing 102. It should be appreciated, however, that the particular configuration and/or the particular location of the protective member(s) 144 may be varied in alternate embodiments without departing from the scope of the present disclosure. For example, it is envisioned that the ladder assembly 10 may include a plurality of protective member(s) 144 configured as standoffs, spacers, etc. (not shown).

The ladder 200 defines a longitudinal axis Y (FIGS. 3, 4) and includes a pair of (e.g., first and second) siderails 202*i*, 202*ii* and a plurality of rungs 204 that extend laterally between the siderails 202*i*, 202*ii*. The ladder 200 is segmented in configuration and, in the particular embodiment illustrated, includes segments 206*i*-206*iv*, each of which includes an upper end 208 and a lower end 210. The segments 206 are arranged in telescopic relation, which allows for relative axial movement therebetween along the longitudinal axis Y during reconfiguration of the ladder 200 between the collapsed configuration and the expanded configuration and, thus, variation in an overall length L (FIG. 4) of the ladder 200. Although shown as including four segments 206 in the particular embodiment of the disclosure illustrated, it should be appreciated that the number of segments 206 may be altered in various embodiments without departing from the scope of the present disclosure (e.g., depending upon the style of the vehicle 20, the location of the point of engagement (connection) between the ladder assembly 10 and the vehicle 20, etc.). As such, embodiments of the ladder 200 including both greater and fewer numbers of segments 206 are also contemplated herein and would not be beyond the scope of the present disclosure.

In certain embodiments of the disclosure, the ladder 200 may include one or more latches 212 (FIGS. 3, 4, 9) that are configured for insertion into corresponding openings 214 on the siderails 202. More specifically, in the particular embodiment illustrated, the latch(es) 212 are included (provided, supported) on (secured to) one or more of the segments 206 (e.g., the rungs 204). Although shown as being oriented for insertion into openings 214 on the siderail 202*ii* in the particular embodiment illustrated, it should be appreciated that the orientation of the latch(es) 212 may be reversed such that they are insertable into openings 214 on the siderails 202*i*. As described in further detail below, the latch(es) 212 inhibit (if not entirely prevent) automatic expansion of the ladder 200 and, via operation of the latch(es) 212, facilitate manual reconfiguration of the ladder 200 from the collapsed configuration into the expanded configuration.

Each latch 212 includes: a locking pin 216 (FIG. 9), which is configured for insertion into the opening(s) 214 on the siderails 202*i*, 202*ii*; a biasing member 218; and a tactile member 220 (e.g., a flange 222, a tab, etc.). Each latch 212 is (slidably) repositionable between an engaged position (FIGS. 3, 4, 9), in which the locking pin 216 is positioned within one of the openings 214 on the siderail 202*ii*, thereby maintaining the relative axial positions of the segments 206 (along the longitudinal axis L), and a disengaged position, in which the locking pin 216 is removed (separated) from the openings 214 on the siderail 202*i*, thereby permitting axial repositioning of the segments 206 (e.g., relative axial movement along the longitudinal axis L). For example, when the latch(es) 212 are in the engaged position, the vertical (longitudinal) positions of the segments 206 are fixed, which allows the ladder 200 (e.g., the length L) to be maintained in either the expanded configuration or the collapsed configuration, and in the disengaged position, the vertical (longitudinal) positions of the segments 206 are variable, which facilitates reconfiguration of the ladder 200 between the collapsed configuration and the expanded configuration and allows the length L of the ladder 200 to be altered as necessary or desired (e.g., depending upon the size of the vehicle 20, the surface being accessed via the ladder 200, etc.).

In the particular embodiment illustrated, the segment 206*ii* includes a latch 212*ii* that engages the segment 206*i* via insertion through (overlapping, aligned) openings 214 defined by the segments 206*i*, 206*ii* so as to maintain the relative axial positions of the segments 206*i*, 206*ii*, the segment 206*iii* includes a latch 212*iii* that engages the segment 206*ii* via insertion through (overlapping, aligned) openings 214 defined by the segments 206*ii*, 206*iii* so as to maintain the relative axial positions of the segments 206*ii*, 206*iii*, and the segment 206*iv* includes a latch 212*iv* that engages the segment 206*iii* via insertion through (overlapping, aligned) openings 214 defined by the segments 206*iii*, 206*iv* so as to maintain the relative axial positions of the segments 206*iii*, 206*iv*.

Figure 9:
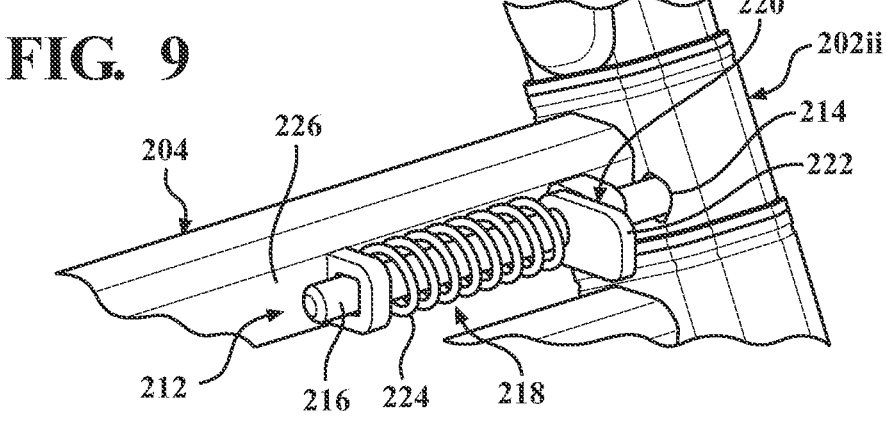
FIG. 9 is a partial, side, perspective view of the ladder assembly illustrating one embodiment of a latching mechanism.

With continued reference to FIGS. 3, 4 and 9, the biasing member 218 includes a coil spring 224 and acts upon the locking pin 216 so as to bias the latch 212 towards the engaged position. When necessary, however, the latch 212 can be moved from the engaged position into the disengaged position via the (manual) application of force to the tactile member 220, which compresses the biasing member 218 so as to create a biasing force that automatically returns the latch 212 to the engaged position upon release of the tactile member 220.

While the ladder 200 is illustrated as including a latch 212 on each of the segments 206ii, 206iii, 206iv (e.g., such that the latches 212 number one less than the segments 206), it should be appreciated that the particular number of latches 212 may be varied in alternate embodiments without departing from the scope of the present disclosure. For example, an embodiment including a single latch 212 on the segment 206iv is also envisioned herein. Additionally, it should be appreciated that the number of openings 214 included on the siderail 202ii may be varied to allows for additional, incremental variation in the overall length L of the ladder 200 so as to increase the versatility of the ladder assembly 10.

Figure 10:
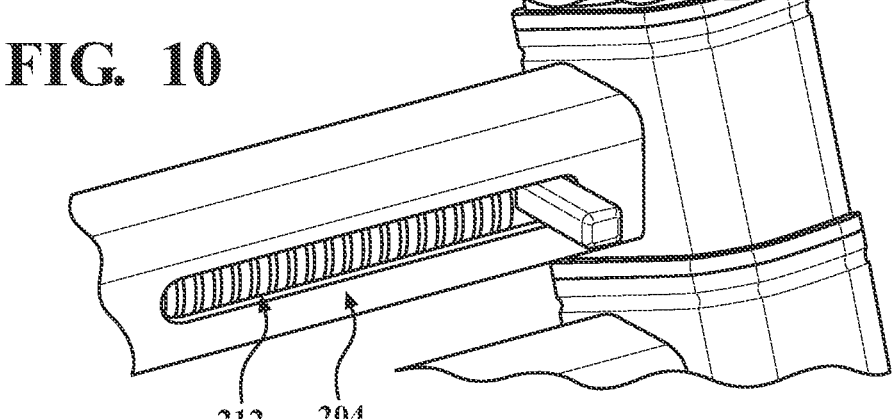
FIG. 10 is a partial, side, perspective view of the ladder assembly illustrating an alternate embodiment of the latching mechanism seen in FIG. 9.

In the particular embodiment of the ladder assembly 10 seen in FIGS. 3, 4, and 9, the latches 212 are included (provided) on (e.g., secured to) exterior surfaces 226 of the rungs 204. Embodiments are also envisioned, however, in which the latches 212 may be located within the rungs 204, as seen in FIG. 10, for example.

To inhibit (if not entirely prevent) the entry of dust, debris, water, etc., into the ladder 200, it is envisioned that the ladder 200 may include a plurality of stoppers 228 (FIGS. 3, 4) that are positioned at the upper ends 208 of the segments 206. The stoppers 228 may include (e.g., may be formed from) any suitable material or combination of metallic or non-materials. For example, in one particular embodiment, it is envisioned that the stoppers 228 may include (e.g., may be formed partially or entirely from) one or more plastic or polymeric materials.

With reference now to FIGS. 11-13 in particular, in certain embodiments of the disclosure, it is envisioned that adjacent segments 206 of the ladder 200 may include a restrictor 230 (e.g., an end cap 232) and a corresponding indentation 234 (e.g., a rib 236, a detent, etc.) that is configured for engagement with the restrictor 230. For example, FIGS. 11-13 show the restrictor 230 as being provided on the lower end 210 of the segment 206i, which extends radially outward therefrom so as to define an outer transverse cross-sectional dimension Do, and the indentation 234 as being provided on the upper end 208 of the segment 206ii, which extends radially inward so as to define an inner transverse cross-sectional dimension Di. While FIGS. 11-13 are specific to the segments 206i, 206ii, it should be appreciated that each of the adjacent segments 206 is configured in a similar manner. More specifically, the segment 206i includes a restrictor 230 at the lower end 210 thereof and is devoid of the indentation 234, the segments 206ii, 206iii each include an indentation 234 at the upper ends 208 thereof and a restrictor 230 at the lower ends 210 thereof, and the segment 206iv includes an indentation 234 at the upper end 208 thereof and is devoice of the restrictor 230.

As seen in FIG. 13, the inner transverse cross-sectional dimension Di defined by the indentation 234 is less than the outer transverse cross-sectional dimension Do defined by the restrictor 230, which facilitates engagement of (contact between) the restrictor 230 and the indentation 234 upon expansion of the ladder 200 so as to define a hard stop 238 that inhibits (if not entirely prevents) overextension of the ladder 200 and unintended separation of the segments 206i, 206ii. During expansion of the ladder 200, it is envisioned that engagement of (contact between) one or more of the restrictors 230 and the indentations 234 may be avoided depending upon the height of the roof rack 24, the orientation of the ladder 200, the location of the point of engagement (connection) between the ladder assembly 10 and the vehicle 20, etc.

The upper end 208 of the segment 206i is pivotably connected to the case 100 via (first and second) pivot members 240i, 240ii (FIG. 3), which extend laterally (e.g., transversely) in relation to the longitudinal axis Y and are configured for positioning with corresponding openings 150, 242 formed in the case 100 and the ladder 200, respectively. In the particular embodiment illustrated, the pivot members 240i, 240ii are configured as discrete components of the ladder assembly 10 that are separate from both the case 100 and the ladder 200. Embodiments in which the pivot members 240i, 240ii may be integrally (e.g., unitarily, monolithically) formed with the case 100 (e.g., the housing 102) or the ladder 200 are also envisioned herein, however. For example, in one embodiment, the pivot members 240i, 240ii may be formed integrally (e.g., unitarily, monolithically) with the case 100 such that the pivot members 240i, 240ii extend into the openings 242 in the ladder 200, whereas in an alternate embodiment, the pivot members 240i, 240ii may be formed integrally (e.g., unitarily, monolithically) with the ladder 200 such that the pivot members 240i, 240ii extend into the openings 150 in the case 100.

The pivot members 240i, 240ii allow for pivotable movement of the ladder 200 in relation to the case 100 and the vehicle 20 both inwardly (e.g., towards the vehicle 20) and outwardly (e.g., away from the vehicle 20) and, thus, reconfiguration of the ladder assembly 10 between the storage configuration (FIGS. 1, 3) and the use configuration (FIG. 4). The pivotable connection between the case 100 and the ladder 200 established by the pivot members 240i, 240ii also allows for adjustment (variation) in an angular orientation of the ladder 200 such that the ladder 200 can be oriented at an angle α (FIG. 4) in relation to the case 100 and the vehicle 20, as described in further detail below.

As seen in FIG. 3, the pivot members 240i, 240ii are located (positioned) so as to define a longitudinal (e.g., vertical) gap V with the upper end 120 of the case 100 that is less than (or equal to) one-half of the depth Dc of the case 100, which allows the ladder 200 to be oriented at any suitable angle α. While it is envisioned that the ladder 200 will generally be oriented such that the angle α lies (substantially) within the range of (approximately) 5 degrees to (approximately) 45 degrees (e.g., depending upon the size of the ladder assembly 10, the style of the vehicle 20, the location of the point of engagement (connection) between the ladder assembly 10 and the vehicle 20, etc.), values for the angle α outside this range are also envisioned herein and would not be beyond the scope of the present disclosure.

With reference again to FIGS. 1-13, use and operation of the ladder assembly 10 will be discussed. Initially, the ladder assembly 10 is installed by releasably connecting the engagement member(s) 106 (FIGS. 1, 3, 4) to the vehicle 20 (e.g., the roof rack 24). Thereafter, the cover 104 is opened (or removed) and the ladder 200 is pivoted outwardly (e.g., away from the vehicle 20) about the pivot members 240i, 240ii (FIG. 3), whereby the ladder 200 exits and extends from the internal cavity 112, thus reconfiguring the ladder assembly 10 from the storage configuration into the use configuration. With the ladder assembly 10 in the use configuration, the ladder 200 can be reconfigured from the collapsed configuration (FIG. 3) into the expanded configuration (FIG. 4), either automatically or manually, during which, the ladder 200 moves along the longitudinal axis Y. In the particular embodiment of the ladder assembly 10 illustrated, the ladder 200 is configured for manual reconfiguration between the collapsed configuration and the expanded configuration via operation of the latches 212 (FIGS. 3, 4, 9) (e.g., via movement of the latches 212 between the engaged position and the disengaged position). Embodiments are also envisioned, however, in which the latches 212 may be omitted such that the ladder 200 is configured for automatic expansion (e.g., under the influence of gravity) upon movement of the ladder assembly 10 into the use configuration.

During expansion of the ladder 200, the segments 206 move in telescopic relation to each other. More specifically, as the ladder 200 expands, the segments 206ii-206iv (FIGS. 3, 4) move axially (longitudinally) in relation to the segment 206i, which remains axially (longitudinally) fixed via the connection to the case 100 established by the pivot members 240i, 240ii. As the ladder 200 expands, depending upon the height of the roof rack 24, the desired orientation of the ladder 200, etc., it is envisioned that one or more of the restrictors 230 and the indentations 234 may be brought into engagement (contact) so as to inhibit (if not entirely prevent) overextension of the ladder 200 and unintended separation of the adjacent segments 206.

Upon movement of the ladder 200 into the expanded configuration, the ladder 200 can be repositioned in relation to the case 100 and the vehicle 20 by pivoting the ladder 200 (e.g., the segment 206i) about the pivot members 240i, 240ii so as to achieve any desired angle α (FIG. 4). Thereafter, if necessary or desired, the securement members 130 (FIG. 5) can be affixed to the vehicle 20 (e.g., via the handles 134), and the ladder 200 can be utilized to access the roof section 22 or any other desired area of the vehicle 20.

When use of the ladder assembly 10 is no longer required, the securement members 130 can be disconnected from the vehicle 20 (e.g., via the relief members 136) and the ladder assembly 10 can be returned to the storage configuration by collapsing the ladder 200 (e.g., following repositioning of the latch(es) 212 into the disengaged position). Thereafter, the ladder 200 can be pivoted inwardly (e.g., towards the vehicle 20), and the cover 104 can be closed (replaced), thereby returning the ladder assembly 10 to the storage configuration.

Figure 14:
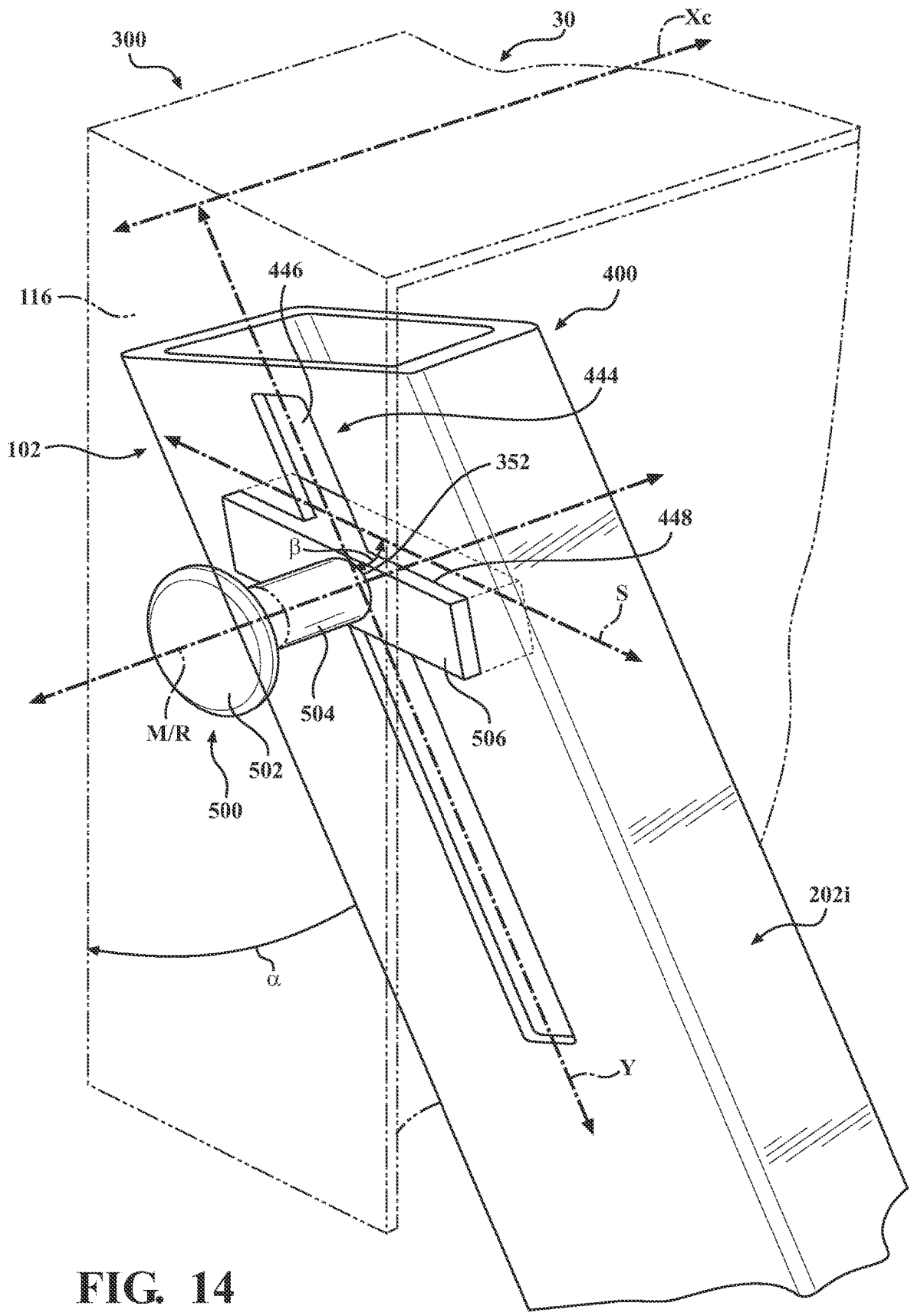
FIG. 14 is partial, side, perspective view of the ladder assembly according to an alternate embodiment of the disclosure, which includes a locking mechanism.

With reference now to FIGS. 14-16, another embodiment of the ladder assembly will be discussed, which is identified by the reference character 30. The ladder assembly 30 is substantially similar in both structure and function to the ladder assembly 10 discussed above (FIGS. 1-13) and, accordingly, in the interest of brevity, will only be discussed with respect to any differences therefrom. As such, identical reference characters will be utilized to refer to elements, structures, features, etc., common to the ladder assemblies 10, 30. As described in detail below, the ladder assembly 30 includes a case 300; an expandable ladder 400; and one or more locking mechanisms 500.

The case 300 is generally identical to the aforedescribed case 100, but for the inclusion of opening(s) 352 in the sidewalls 116, 118 (scc also FIG. 1) of the housing 102 that are configured to receive the locking mechanism(s) 500. In the particular embodiment illustrated, the ladder assembly 30 includes a pair of locking mechanisms 500. As such, the sidewalls 116, 118 each include a corresponding opening 352. Embodiments are also envisioned, however, in which the ladder assembly 30 may include a single locking mechanism 500, which would allow for the elimination of the opening 352 from one of the sidewalls 116, 118.

The ladder 400 is generally identical to the aforedescribed ladder 200, but for the inclusion of locking groove(s) 444 in the siderails 202i, 202ii, each of which includes a channel 446 and slot 448. The locking groove(s) 444 are configured to receive the locking mechanisms 500 such that the locking mechanisms 500 extend through the case 300 and into the ladder 400, whereby the ladder 400 is movably (e.g., slidably and pivotably (rotatably)) supported by the locking mechanisms 500, which allows for omission of the pivot members 240i, 240ii (FIG. 3).

In the particular embodiment of the ladder assembly 30 illustrated, the ladder 400 includes a pair of locking grooves 444 (e.g., one in each of the siderails 202i, 202ii) that are configured to receive the pair of locking mechanisms 500, whereby the siderails 202i, 202ii are generally identical in configuration. Embodiments are also envisioned, however, in which the siderails 202i, 202ii may be non-identical. For example, as indicated above, the present disclosure contemplates embodiments in which the ladder assembly 30 may include a single locking mechanism 500, which would allow for the elimination of the locking groove 444 from one of the siderails 202i, 202ii.

The channels 446 extend in generally parallel relation to the longitudinal axis Y and are generally linear in configuration. The channels 446 are configured to receive the locking mechanisms 500 such that the ladder 400 is axially (e.g., vertically) movable in relation to the case 300, the locking mechanisms 500, and the vehicle 20 (FIG. 4), as described in further detail below.

The slots 448 are each configured to receive one of the locking mechanisms 500 and extend in non-parallel (e.g., transverse) relation to the longitudinal axis Y and the channels 446. More specifically, each of the slots 448 extends along an axis S that subtends an angle β with the longitudinal axis Y that lies (substantially) within the range of (approximately) 5 degrees to (approximately) 45 degrees. Embodiments in which the angle β may lie outside the range disclosed above are also envisioned herein and would not be beyond the scope of the present disclosure (e.g., depending upon the size of the ladder assembly 30, the style of the vehicle 20, the location of the point of engagement (connection) between the ladder assembly 30 and the vehicle 20, etc.).

With continued reference to FIGS. 14-16, the locking mechanisms 500 will be discussed. The locking mechanisms 500 are identical in configuration and each include: a head 502; a stem 504; and an anchor 506. The locking mechanisms 500 are supported by the case 300 and are (slidably) repositionable between an unlocked position (FIG. 15), in which the locking mechanisms 500 (e.g., the anchors 506) are disengaged from the ladder 400 (e.g., separated (removed) from the locking grooves 444), and a locked position (FIGS. 14, 16), in which the locking mechanisms 500 (e.g., the anchors 506) are engaged with the ladder 400 (e.g., positioned within (received by) the locking grooves 444). More specifically, the locking mechanisms 500 are (slidably) repositionable along axes of movement M, which extends in transverse (e.g., generally orthogonal) relation to the longitudinal axis Y of the ladder 400 and in generally parallel relation to the axis Xc of the case 300. In the unlocked position (FIG. 15), the ladder 400 is pivotably (rotatably) and axially movable in relation to the case 300 (and the vehicle 20) about the locking mechanisms 500, which facilitates positioning of the ladder 400 in an unlimited number of angular orientations as well as axial (longitudinal, vertical) movement of the ladder 400 so as to achieve any desired angle α and height of the ladder 400. In the locked position (FIGS. 14, 16), however, movement of the ladder 400 in relation to the case 300 (and the vehicle 20) is restricted, whereby axial (longitudinal, vertical) repositioning of the ladder 400 is inhibited (if not entirely prevented) so as to fixing the axial (longitudinal, vertical) position of the ladder 400.

The heads 502 are located externally of the case 300, which allows for the manual application of force to the locking mechanisms 500 and, thus, repositioning of the locking mechanisms 500 between the unlocked position and the locked position. More specifically, the locking mechanisms 500 are laterally movable (e.g., along the axes of movement M) from the unlocked position into the locked position via the application of a pulling force that is directed laterally outward (e.g., away from the ladder 400) and from the locked position into the unlocked position via the application of a pushing force that is directed laterally inward (e.g., towards the ladder 400).

In the particular embodiment illustrated, the locking mechanisms 500 are freely rotatable in relation to the case 300 and the ladder 400 in the unlocked position, during which, the anchors 506 rotate within the siderails 202$i$, 202$ii$. More specifically, the locking mechanisms 500 are rotatable about axes of rotation R, which extend through the stems 504 in transverse (e.g., generally orthogonal) relation to the longitudinal axis Y and in generally parallel relation to the axes of movement M. Embodiments are also envisioned, however, in which the locking mechanisms 500 may be rotationally fixed in relation to the case 300 and the ladder 400 in the unlocked position. For example, it is envisioned that the locking mechanisms 500 may include one or more projections (e.g., ribs, detents, etc.) that are configured for insertion into one or more corresponding recesses (e.g., slots, depressions, etc.) on the case 300 and/or the ladder 400, or vice versa (e.g., the projection(s) may be provided on the case 300 and/or the ladder 400 and the recess(es) may be provided on the locking mechanisms 500).

The stems 504 extends laterally inward from the heads 502 (e.g., towards the ladder 400) and are received by (positioned within) the openings 352 in the sidewalls 116, 118 of the housing 102. The stems 504 extend into the ladder 400 so as to support axial (e.g., longitudinal, vertical) and pivotable (rotational) movement of the ladder 400 in relation to the case 300 (and the vehicle 20).

The anchors 506 extend outwardly from the stem 504 in transverse (e.g., generally orthogonal relation) to the stem 504 and are configured for insertion into and removal from the locking grooves 444 (e.g., the slots 448) in the siderails 202$i$, 202$ii$ during repositioning of the locking mechanisms 500 between the unlocked position and the locked position. The anchors 506 and the slots 448 include corresponding non-circular cross-sectional configurations. More specifically, in the particular embodiment illustrated, the anchors 506 and the slots 448 each include generally linear, rectangular cross-sectional configurations. It should be appreciated, however, that the anchors 506 and the slots 448 may include any cross-sectional configurates suitable for the intended purpose of inhibiting (if not entirely preventing) relative rotation between the locking mechanisms 500 and the ladder 400 when the locking mechanisms 500 are in the locked position. For example, embodiments are also envisioned in which the anchors 506 and the slots 448 may be non-linear (e.g., arcuate, sinusoidal, etc.) in configuration.

With continued reference to FIGS. 14-16, use and operation of the ladder assembly 30 will be discussed. Initially, the ladder assembly 30 is installed, the cover 104 (FIG. 1) is opened (or removed), and the ladder 400 is reconfigured from the collapsed configuration (FIG. 3) into the expanded configuration (FIG. 4), either automatically or manually. Thereafter, the ladder 400 can be oriented as necessary or desired by pivoting the ladder 400 in relation to the case 300 (and the vehicle 20) about the locking mechanisms 500 so as to vary the angle α. Additionally, if necessary or desired, the ladder 400 can be moved axially (e.g., vertically) within the internal cavity 112 (FIGS. 3, 4) so as to vary the vertical position (height) of the ladder 400, during which, the locking mechanisms 500 (e.g., the stems 504) move through the channels 446 of the locking grooves 444. The locking mechanisms 500 can then be engaged via movement from the unlocked position (FIG. 15) into the locked position (FIGS. 14, 16) via the manual application of an outwardly-directed (pulling) force to the heads 502. As the locking mechanisms 500 move from the unlocked position into the locked position, the stems 504 slide within the openings 352 in the sidewalls 116, 118 of the housing 102, which causes movement of the anchors 506 into the slots 448, thereby fixing the vertical position of the ladder 400.

When use of the ladder assembly 30 is no longer required, the locking mechanisms 500 can be moved from the locked position (FIGS. 14, 16) into the unlocked position (FIG. 15) via the manual application of an inwardly-directed (pushing) force to the heads 502. As the locking mechanisms 500 move from the locked position into the unlocked position, the stems 504 slide within the openings 352 in the sidewalls 116, 118 of the housing 102, which causes movement of the anchors 506 out of the slots 448. The ladder assembly 30 can then be returned to the storage configuration by raising and collapsing the ladder 400, pivoting the ladder 400 inwardly (e.g., towards the vehicle 20), and closing (replacing) the cover 104.

Figure 17:
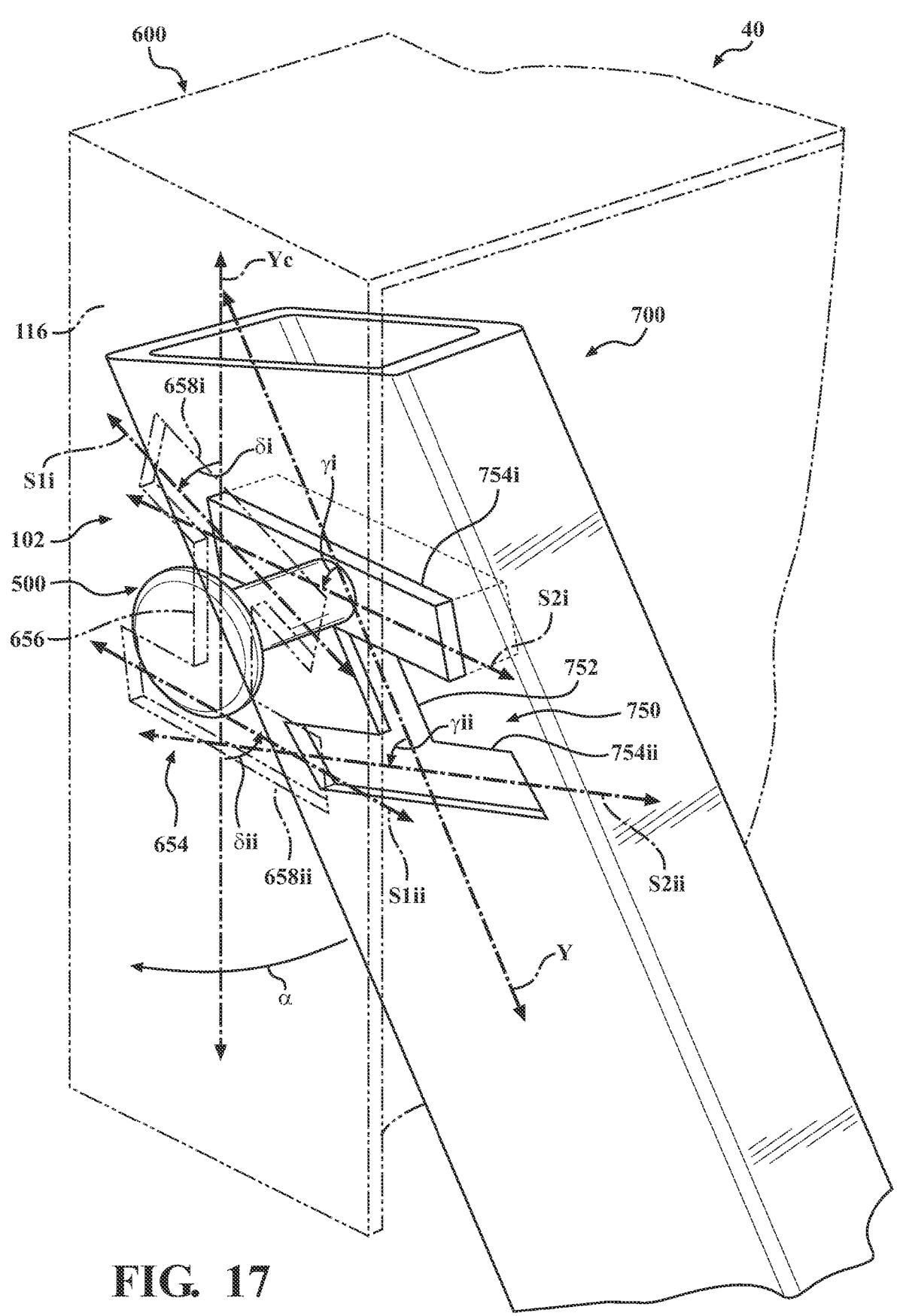
FIG. 17 is partial, side, perspective view of an alternate embodiment of the ladder assembly seen in FIG. 14.

With reference now to FIGS. 17, another embodiment of the ladder assembly will be discussed, which is identified by the reference character 40. The ladder assembly 40 is substantially similar in both structure and function to the ladder assembly 30 discussed above (FIG. 14) and, accordingly, in the interest of brevity, will only be discussed with respect to any differences therefrom. As such, identical reference characters will be utilized to refer to elements, structures, features, etc., common to the ladder assemblies 30, 40. As described in detail below, in addition to the locking mechanisms 500, the ladder assembly 40 includes a case 600 and an expandable ladder 700.

The case 600 is generally identical to the aforedescribed case 300, but for the inclusion of locking grooves 654 in the sidewalls 116, 118 of the housing 102, which replace the openings 352 (FIG. 14). The locking grooves 654 are configured to receive the locking mechanisms 500 and include a generally I-shaped configuration. More specifically, each of the locking grooves 654 includes (defines) a channel 656 and respective upper and lower (first and second) slots 658$i$, 658$ii$.

The channels 656 extend in generally parallel relation to the longitudinal axis Yc of the case 600 and receive the locking mechanisms 500 such that the locking mechanisms 500 extend through the case 600 and into the ladder 700, which allows for axial (e.g., vertical) movement of the ladder 700 in relation to the case 600 (and the vehicle 20 (FIG. 4).

The slots 658$i$, 658$ii$ extend in non-parallel (e.g., transverse) relation to the longitudinal axis Yc and the channel 656. The slots 658$i$, 658$ii$ are vertically offset and are spaced apart from each other along the longitudinal axis Yc of the case 600. The slots 658$i$, 658$ii$ are each configured to receive one of the locking mechanisms 500 and are oriented at different angles in relation to the longitudinal axis Yc of the case 600. More specifically, the slot 658$i$ extends along a (first) axis S1$i$ that subtends a (first) angle δi with the longitudinal axis Yc and the slot 658*ii* extends along a (second) axis S1*ii* that subtends a (second) angle δii with the longitudinal axis Yc that is greater than the angle δi. In the particular embodiment illustrated, the case 600 is configured such that the angle δi lies (substantially) within the range of (approximately) 5 degrees to (approximately) 45 degrees and such that the angle dii lies (substantially) within the range of (approximately) 20 degrees to (approximately) 60 degrees. Embodiments in which the angle δi and/or the angle δii may lie outside the ranges disclosed above are also envisioned herein and would not be beyond the scope of the present disclosure (e.g., depending upon the size of the ladder assembly 40, the style of the vehicle 20, the location of the point of engagement (connection) between the ladder assembly 40 and the vehicle 20, etc.).

With continued reference to FIG. 15, the ladder 700 is generally identical to the aforedescribed ladder 400, but for the inclusion of locking grooves 750. In contrast to the locking grooves 444 included on the ladder 400, the locking grooves 750 each include a generally I-shaped configuration corresponding to that defined by the locking grooves 654 on the case 600. As such, each of the locking grooves 750 includes (defines) a channel 752 and respective upper and lower (first and second) slots 754*i*, 754*ii*.

The channels 752 extend in generally parallel relation to the longitudinal axis Y and corresponds to and are aligned with the channels 656 on the case 600. The channels 752 receive the locking mechanisms 500 such that the locking mechanisms 500 extend through the case 600 and into the ladder 700, which allows for axial (e.g., vertical) movement of the ladder 700 in the manner discussed above.

The slots 754*i*, 754*ii* extend in non-parallel (e.g., transverse) relation to the longitudinal axis Y and the channel 752. The slots 754*i*, 754*ii* correspond to and are aligned with the slots 658*i*, 658*ii*. As such, the slots 754*i*, 754*ii* are vertically offset and are spaced apart from each other along the longitudinal axis Y. The slots 754*i*, 754*ii* are each configured to receive one of the locking mechanisms 500 and are oriented at different angles in relation to the longitudinal axis Y of the ladder 700. More specifically, the slot 754*i* extends along a (first) axis S2*i* that subtends a (first) angle γi with the longitudinal axis Y, which corresponds (e.g., is identical) to the angle δi, and the slot 754*ii* extends along a (second) axis S2*ii* that subtends a (second) angle γii with the longitudinal axis Y that is greater than the angle γi and which corresponds (e.g., is identical) to the angle dii.

While the case 600 and the ladder 700 are each illustrated as including a pair of slots 658, 754, respectively, it should be appreciated that the number of slots 658, 754 may be increased in alternate embodiments without departing from the scope of the present disclosure. As such, embodiments of the ladder assembly 40 include three or more or each slot 658, 754 are also envisioned herein.

With continued reference to FIG. 15, use and operation of the ladder assembly 40 will be discussed. Following installation of the ladder assembly 40, opening (removal) of the cover 104 (FIG. 1), and deployment (expansion) of the ladder 700, the ladder 700 can be oriented as necessary or desired (e.g., by pivoting the ladder 700 so as to vary the angle α and varying the vertical position (height) of the ladder 700). Thereafter, the locking mechanisms 500 can be engaged via movement from the unlocked position into the locked position.

In contrast to the ladder assembly 30 (FIG. 14), in which the ladder 400 is positionable in an unlimited number of angular orientations, the ladder 700 is positionable in a plurality of discrete angular orientations that are dictated by the configurations of the slots 658*i*, 658*ii* on the case 600 and the slots 754*i*, 754*ii* on the ladder 700. For example, depending upon the size of the ladder assembly 40, the style of the vehicle 20, the location of the point of engagement (connection) between the ladder assembly 40 and the vehicle 20, etc., it is envisioned that the locking mechanisms 50 may be positioned within the slots 658*i*, 754*i* or within the slots 658*ii*, 754*ii*.

When use of the ladder assembly 40 is no longer required, the locking mechanisms 500 can be moved from the locked position into the unlocked position, and the ladder assembly 40 can then be returned to the storage configuration by raising and collapsing the ladder 700, pivoting the ladder 700 inwardly (e.g., towards the vehicle 20), and closing (replacing) the cover 104.

With reference now to FIGS. 18-23, another embodiment of the ladder assembly will be discussed, which is identified by the reference character 50. The ladder assembly 50 is substantially similar in both structure and function to the ladder assembly 10 discussed above (FIGS. 1-13) and, accordingly, in the interest of brevity, will only be discussed with respect to any differences therefrom. As such, identical reference characters will be utilized to refer to elements, structures, features, etc., common to the ladder assemblies 10, 50. As described in detail below, the ladder assembly 50 includes a case 800; an expandable ladder 900; and a locking mechanism 1000.

The case 800 is generally identical to the aforedescribed case 100, but for the inclusion of mounting plates 860*i*, 860*ii*, which are secured (connected) to the sidewalls 116, 118 of the housing 102. The mounting plates 860*i*, 860*ii* not only include (or otherwise support) the pivot members 240*i*, 240*ii*, respectively, but create sufficient lateral clearance 862 (FIG. 18) (e.g., along the axis Xc of the case 800) between the sidewalls 116, 118 and the ladder 900 so as to facilitate exit of the ladder 900 from the internal cavity 112 and entry of the ladder 900 into the internal cavity 112 during reconfiguration of the ladder assembly 50 between the storage configuration and the use configuration. Although shown as being integrally (e.g., unitarily, monolithically) formed with the sidewalls 116, 118 in the particular embodiment illustrated, it is also envisioned that the mounting plates 860*i*, 860*ii* may be formed as discrete components of the case 800 that may be connected to the sidewalls 116, 118 in any suitable manner including, for example, via one or mechanical fasteners (e.g., pins, screws, clips, etc.), via an adhesive, via welding, etc.

Figures 19, 20:
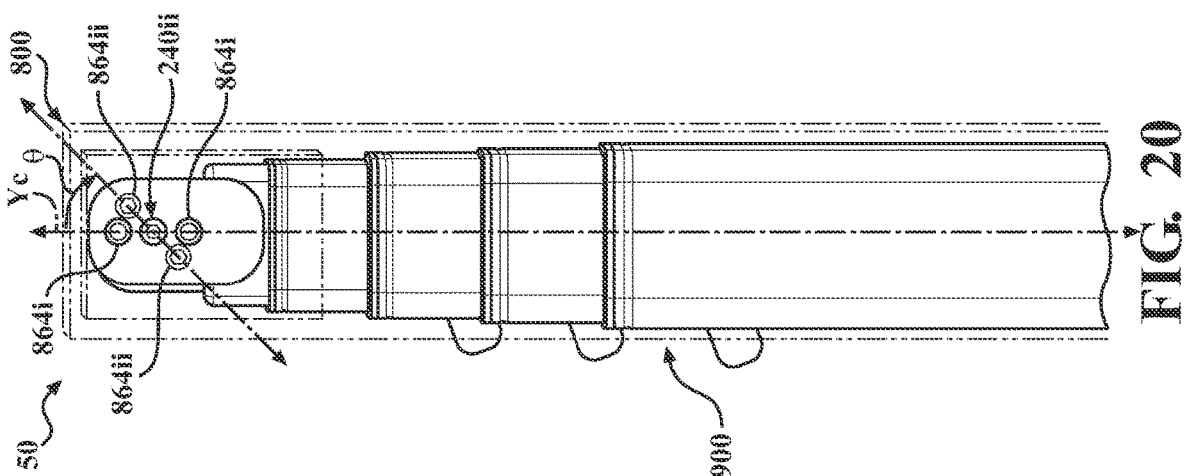
FIG. 19 is a side, perspective view of the ladder assembly seen in FIG. 18 shown in the use configuration with the ladder shown in the collapsed configuration.
FIG. 20 is a side, plan view of the ladder assembly seen in FIG. 18 shown in the storage configuration with the ladder shown in the collapsed configuration.
Figure 21:
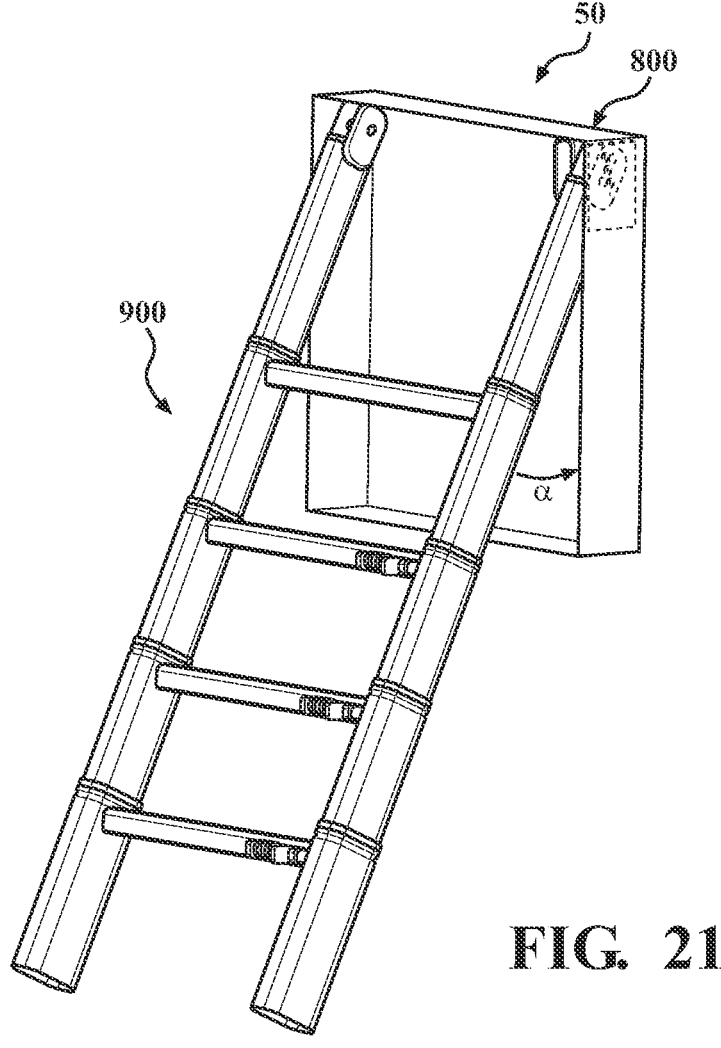
FIG. 21 is a side, perspective view of the ladder assembly seen in FIG. 18 shown in the use configuration with the ladder shown in the expanded configuration.

Although similar in construction, the mounting plates 860*i*, 860*ii* include non-identical configurations. More specifically, as seen in FIGS. 19 and 20, the mounting plate 860*ii* includes one or more (first) locking apertures 864*i*, which are configured to receive the locking mechanism 1000 and thereby fix the ladder 900 in a first angular orientation, and one or more (second) locking apertures 864*ii*, which are configured to receive the locking mechanism 1000 and thereby fix the ladder 900 in a second angular orientation. Although the locking apertures 864*i*, 864*ii* are provided in pairs in the particular embodiment of the ladder assembly 50 illustrated, it should be appreciated that the number of locking apertures 864*i*, 864*ii* may be varied in alternate embodiments without departing from the scope of the present disclosure. For example, an embodiment in which the ladder assembly 50 includes a single locking aperture 864*i* and a single locking aperture 864*ii* is also envisioned herein.

Whereas the locking apertures 864*i* are oriented in general (vertical) alignment with the longitudinal axis Yc of the case 800 and each other, the locking apertures 864*ii* are angularly (rotationally) offset from the longitudinal axis Yc and the locking apertures 864*i* by an angular distance θ, which corresponds to and dictates the angular orientation (e.g., the angle α (FIGS. 19, 21)) of the ladder 900 upon deployment. As such, by varying the angular distance θ, the angular orientation of the ladder 900 when the ladder assembly 50 is in use configuration can be customized.

In the particular embodiment illustrated, the mounting plate 860*ii* is configured such that the angular distance θ lies (substantially) within the range of (approximately) 5 degrees to (approximately) 45 degrees (e.g., depending upon the size of the ladder assembly 50, the style of the vehicle 20, the location of the point of engagement (connection) between the ladder assembly 50 and the vehicle 20, etc.). Embodiments in which the angular distance θ may lie outside this range are also envisioned herein, however, and would not be beyond the scope of the present disclosure.

The ladder 900 is generally identical to the aforedescribed ladder 200, but for the inclusion of (first and second) mounting brackets 956, 958. The mounting brackets 956, 958 provide a pivotable interface between the case 800 and the ladder 900 that facilitates angular adjustment of the ladder 900, as described in further detail below, and may include (e.g., may be formed from) any suitable material or combination of materials (either metallic or non-metallic). In the particular embodiment illustrated, the mounting brackets 956, 958 each include an integral (e.g., unitary, monolithic) construction. Embodiments are also envisioned, however, in which the mounting brackets 956, 958 may include a plurality of discrete components that may be connected together in any suitable manner including, for example, via one or mechanical fasteners (e.g., pins, screws, clips, etc.), via an adhesive, via welding, etc.

The mounting bracket 956 includes a base 960 and a pair of mounting flanges 962*i*, 962*ii* that extend axially (longitudinally, vertically) from the base 960, and the mounting bracket 958 includes a base 964 and a pair of mounting flanges 966*i*, 966*ii* that extend axially (longitudinally, vertically) from the base 964. Although similar in construction, the mounting flanges 962, 966 and, thus, the mounting brackets 956, 958 include non-identical configurations, as described in further detail below.

The bases 960, 964 are configured for insertion into the segment 206*i* and may be secured (connected) thereto in any suitable manner. In the particular illustrated, the bases 960, 964 are configured for engagement (contact) with the segment 206*i* in an interference (friction) fit. For example, it is envisioned that the bases 960, 964 may include one or more projections (e.g., ribs) that are configured for engagement (contact) with an inner surface of the segment 206*i*. Embodiments are also envisioned, however, in which the mounting brackets 956, 958 may be configured for connection to the segment 206*i* via one or mechanical fasteners (e.g., pins, screws, clips, etc.), via an adhesive, via welding, etc.

The mounting flanges 962*i*, 962*ii* each include (define) an opening 968 (FIG. 19) that is configured to receive the pivot member 240*i* such that the pivot member 240*i* extends through the mounting bracket 956, and the mounting flanges 966*i*, 966*ii* each include (define) a (first) opening 970 (FIG. 23) that is configured to receive the pivot member 240*ii* such that the pivot member 240*ii* extends through the mounting bracket 958. Additionally, however, the mounting flanges 966*i*, 966*ii* each include (define) a pair of (second) openings 972 (FIG. 23) that are configured to receive the locking mechanism 1000 such that the locking mechanism 1000 extends through the mounting bracket 958 and into engagement with the case 800, as described in further detail below.

Although the openings 972 are provided in a pair in the particular embodiment of the ladder assembly 50 illustrated, it should be appreciated that the number of openings 972 may be varied in alternate embodiments without departing from the scope of the present disclosure. For example, an embodiment in which the mounting flanges 966*i*, 966*ii* each include a single opening 972 is also envisioned herein.

Figures 22, 23:
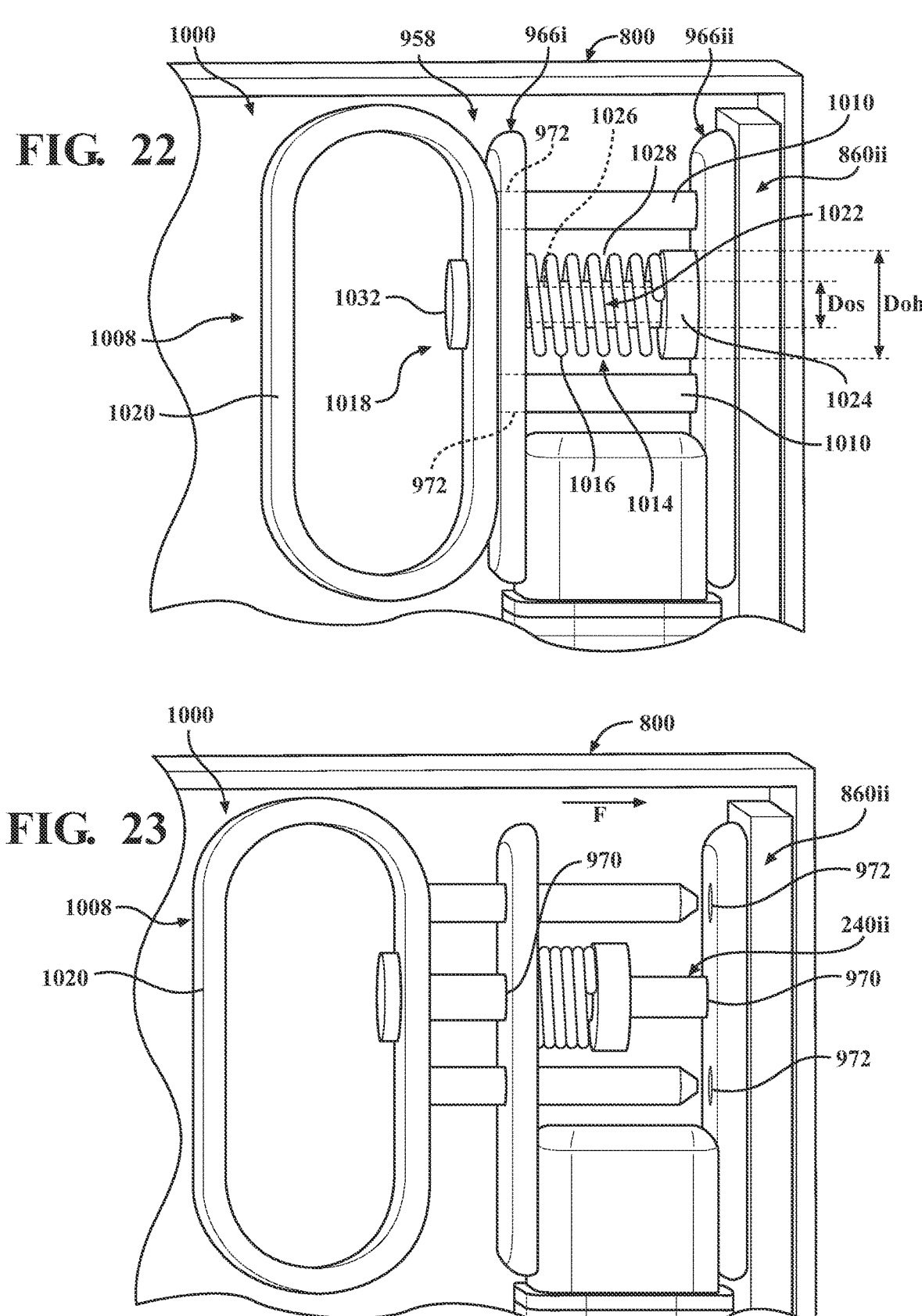
FIG. 22 is an enlargement of the area of detail identified in FIG. 18 with the (spring-biased) locking mechanism shown in a locked configuration.
FIG. 23 is a front, perspective view of the (spring-biased) locking mechanism shown in an unlocked configuration.
Figure 24:
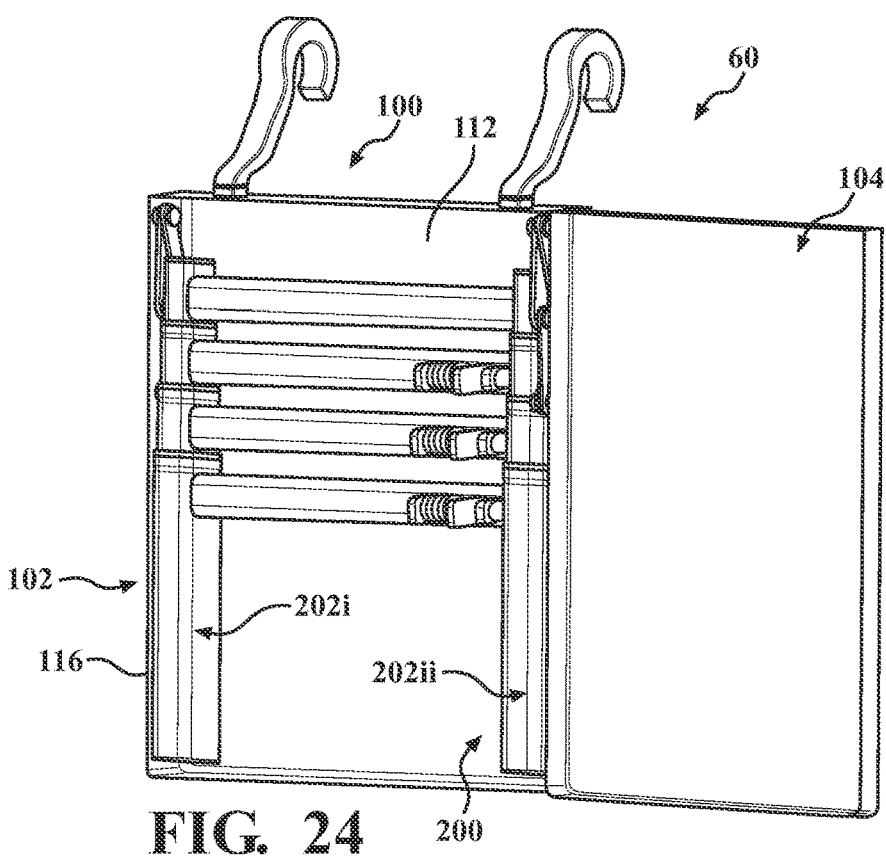
FIG. 24 is a front, perspective view of the ladder assembly according to an alternate embodiment of the disclosure, which includes a case, an expandable ladder, and a pair of hinge mechanisms.

With reference now to FIGS. 22 and 23 in particular, the locking mechanism 1000 will be discussed. The locking mechanism 1000 facilitates variation in the angular orientation of the ladder 900 (e.g., the angle α (FIGS. 19, 21)) includes: a tactile member 1008; one or more locking pins 1010; a piston 1012; a biasing member 1014 (e.g., a coil spring 1016); and a cap 1018.

The tactile member 1008 facilitates the manual application of force to the locking mechanism 1000 and, thus, reconfiguration of the locking mechanism 1000 between a locked configuration (FIG. 22), in which the locking mechanism 1000 extends through the ladder 900 and into the case 800 (e.g., the mounting plate 860*ii*) to thereby fix (maintain) the angular orientation of the ladder 900 (e.g., the angle α), and an unlocked configuration (FIG. 23), in which the locking mechanism 1000 is separated from the case 800 (e.g., the mounting plate 860*ii*) to allow for adjustment (variation) of the angular orientation (e.g., the angle α) of the ladder 900. Although generally shown as an ovate ring 1020 in the particular embodiment illustrated, it should be appreciated that the tactile member 1008 may be configured in any manner suitable for the intended purpose of applying force to the locking mechanism 1000 so as to reconfigure the locking mechanism 1000 in the manner described herein.

The locking pins 1010 are positioned within (accommodated by) the openings 972 in the mounting flanges 966*i*, 966*ii* and are configured for removable insertion into the locking apertures 864*i*, 864*ii* in the mounting plate 860*ii* during repositioning of the locking mechanism 1000 between the locked configuration (FIG. 22) and the unlocked configuration (FIG. 23). More specifically, when the locking pins 1010 are inserted into the locking apertures 864*i*, the ladder assembly 50 is fixed (secured, maintained) in the storage configuration in a first (e.g., vertical) angular orientation in which the angle α has a first value, and when the locking pins 1010 are inserted into the locking apertures 864*ii*, the ladder assembly 50 is fixed (secured, maintained) in the use configuration in a second (e.g., non-vertical) angular orientation in which the angle α has a second value. The locking mechanism 1000 thus provides an anti-rotation feature that fixes (maintains) the angular orientation of the ladder 900 when the ladder assembly 50 is in both the storage configuration (FIGS. 18, 20 (e.g., when the ladder 900 is collapsed and positioned within the internal cavity 112) and the use configuration (FIGS. 19, 21) (e.g., when the ladder 900 is expanded and extends from the internal cavity 112).

The locking pins 1010 extend laterally from the tactile member 1008 and are connected (secured) thereto such that movement of the tactile member 1008 causes corresponding movement of the locking pins 1010. Although shown as being integrally (e.g., unitarily, monolithically) formed with the tactile member 1008 in the particular embodiment illustrated, it is also envisioned that the locking pins 1010 may be formed as discrete components of the locking mechanism 1000 that may be connected to the tactile member 1008 in any suitable manner including, for example, via one or mechanical fasteners (e.g., pins, screws, clips, etc.), via an adhesive, via welding, etc.

Although the ladder assembly 50 is illustrated as including a pair of locking pins 1010 in the particular embodiment illustrated, it should be appreciated that the number of locking pins 1010 may be varied in alternate embodiments without departing from the scope of the present disclosure. For example, an embodiment in which the ladder assembly 50 includes a single locking pin 1010 is also envisioned herein.

The piston 1012 includes a stem 1022 and a head 1024 and is positioned between the mounting flanges 966i, 966ii. The piston 1012 is connected to the tactile member 1008 such that movement of the tactile member 1008 causes corresponding movement of the piston 1012. Although shown as being integrally (e.g., unitarily, monolithically) formed with the tactile member 1008 in the particular embodiment illustrated, it is also envisioned that the piston 1012 may be formed as discrete component of the locking mechanism 1000 that may be connected to the tactile member 1008 in any suitable manner including, for example, via one or mechanical fasteners (e.g., pins, screws, clips, etc.), via an adhesive, via welding, etc.

The stem 1022 defines an outer transverse cross-sectional dimension Dos (e.g., a diameter) and includes a channel 1026 that is configured to receive the pivot member 240ii such that the pivot member 240ii extends into the locking mechanism 1000 (e.g., the piston 1012) and supports the locking mechanism 1000 during reconfiguration between the locked configuration and the unlocked configuration.

The head 1024 extends radially outward from the stem 1022 and defines an outer transverse cross-sectional dimension Doh (e.g., a diameter) that is greater than the transverse cross-sectional dimension Dos defined by the stem 1022. Together with the stem 1022, the head 1024 defines a receiving space 1028 for the biasing member 1014.

The biasing member 1014 is supported by (e.g., is positioned about) the stem 1022 and is located within the receiving space 1028, which renders the biasing member 1014 captive to the locking mechanism 1000. More specifically, the biasing member 1014 is positioned between the mounting flange 966i and the head 1024 of the piston 1012, which allows for compression of the biasing member 1014 during reconfiguration of the locking mechanism 1000 from the locked configuration into the unlocked configuration.

The cap 1018 is configured for connection to the pivot member 240ii, which secures the locking mechanism 1000 in relation to the mounting bracket 958. In the particular embodiment illustrated, the cap 1018 is configured as a mechanical fastener 1030 (e.g., a nut 1032, a screw, a pin, a clip, etc.), which allows for releasable connection of the cap 1018 to the pivot member 240ii so as to permit disconnection of the locking mechanism 1000 (e.g., to facilitate repair, replacement, maintenance, etc.). Embodiments in which the cap 1018 may be fixedly (e.g., non-removably) connected to the pivot member 240ii are also envisioned herein, however, and would not be beyond the scope of the present disclosure. It is also envisioned that the locking mechanism 1000 may be secured in relation to the mounting bracket 958 by peening an end of the pivot member 240ii, which would allow for elimination of the cap 1018.

With continued reference to FIGS. 18-23, use and operation of the ladder assembly 50 will be discussed. Initially, the ladder assembly 50 is installed (with the ladder 900 in the collapsed configuration and the locking mechanism 1000 in the locked configuration (FIG. 22), and the cover 104 (FIG. 3) is opened (or removed). Thereafter, the locking mechanism 1000 is moved into the unlocked configuration (FIG. 23) by (manually) applying a pulling force to the tactile member 1008 that is directed laterally inward (e.g., towards the mounting bracket 956. Movement of the tactile member 1008 causes corresponding movement of the locking pins 1010 and the piston 1012, which results in removal (separation) of the locking pins 1010 from the locking apertures 864i and compression of the biasing member 1014 between the mounting flange 966i and the head 1024 of the piston 1012. Compression of the biasing member 1014 creates a biasing force F in the biasing member 1014 that is directed laterally outward (e.g., away from the mounting bracket 956. The biasing force F acts upon the piston 1012 and biases the locking mechanism 1000 toward the locked configuration such that the locking mechanism 1000 is (automatically) returned to the locked configuration upon release of the tactile member 1008.

Following removal of the locking pins 1010 from the locking apertures 864i, the ladder assembly 50 can be moved from the storage configuration (FIGS. 18, 20) into the use configuration (FIGS. 19, 21) by pivoting the ladder 900 about the pivot members 240i, 240ii. When the ladder assembly 50 is in the storage configuration, the openings 972 in the mounting flanges 966i, 966ii re aligned with the locking apertures 864i, and when the ladder assembly 50 is in the use configuration, the openings 972 in the mounting flanges 966i, 966ii are aligned with the locking apertures 864ii. After pivoting of the ladder 900, the ladder 900 can be reconfigured from the collapsed configuration (FIGS. 18, 19) into the expanded configuration (FIG. 21), either automatically or manually. Thereafter, the locking mechanism 1000 is (automatically) returned to the locked configuration (FIG. 22) (e.g., under the influence of the biasing force F), during which, the locking pins 1010 are inserted into the locking apertures 864ii, thereby fixing (maintaining) the angular orientation of the ladder 900.

When use of the ladder assembly 50 is no longer required, the ladder 900 can be returned to the collapsed configuration and the locking mechanism 1000 can again be moved from the locked configuration (FIG. 22) into the unlocked configuration (FIG. 23), during which, the locking pins 1010 are removed from the locking apertures 864ii. Following removal of the locking pins 1010 from the locking apertures 864ii, the ladder assembly 50 can be returned to the storage configuration by pivoting the ladder 900 inwardly (e.g., towards the vehicle 20), which again aligns the openings 972 in the mounting flanges 966i, 966ii with the locking apertures 864i, and the cover 104 can be closed (replaced).

With reference now to FIGS. 24-28, another embodiment of the ladder assembly will be discussed, which is identified by the reference character 60. The ladder assembly 60 is substantially similar in both structure and function to the ladder assembly 10 discussed above (FIGS. 1-13) and, accordingly, in the interest of brevity, will only be discussed with respect to any differences therefrom. As such, identical reference characters will be utilized to refer to elements, structures, features, etc., common to the ladder assemblies 10, 60. As described in detail below, in addition to the case 100 and the expandable ladder 200, the ladder assembly 60 includes a pair of (generally identical) hinge mechanisms 1100.

The hinge mechanisms 1100 extend between and are pivotably connected to the sidewalls 116, 118 of the housing 102 and the siderails 202i, 202ii of the ladder 200, respectively, which allows for omission of the pivot members 240i,240ii (FIG. 3). Each of the hinge mechanisms 1100 includes a plurality of links 1102 that are pivotably connected to each other by a plurality of pivot members 1104 (e.g., pins, dowels, rivets, etc.) and a locking mechanism

1106. Although illustrated as including four links 1102i-1102iv, three pivot members 1104i-1104iii, and a single locking mechanism 1106 in the particular embodiment illustrated, it should be appreciated that the particular number of links 1102, pivot members 1104, and/or locking mechanisms 1106 may be varied in alternate embodiments without departing from the scope of the present disclosure.

The pivot members 1104i (which are hidden from view by the case 100) extend through the case 100 and the links 1102i, 1102iv so as to pivotably connect the hinge mechanisms 1100 to the case 100. Pivotably connecting the hinge mechanisms 1100 to the case 100 allows for reconfiguration of the ladder assembly 60 between the storage (closed) configuration (FIG. 24) and the use (open) configuration (FIG. 25) and deployment of the ladder 200.

The pivot members 1104ii pivotably connect the hinge mechanisms 1100 to the ladder 200 and extend into (through) the ladder 200 (e.g., the segment 206i) and the links 1102ii, 1102iii. Pivotably connecting the hinge mechanisms 1100 to the ladder 200 allows for variation in the angular position of the ladder 200 as well as the vertical position (height) of the ladder 200, which can be fixed (maintained) via engagement of the locking mechanism 1106, as described in further detail below.

The pivot members 1104iii extend through the links 1102iii, 1102iv, which facilitates reconfiguration of the ladder assembly 60 between the storage (closed) configuration and the use (open) configuration.

Figure 25:
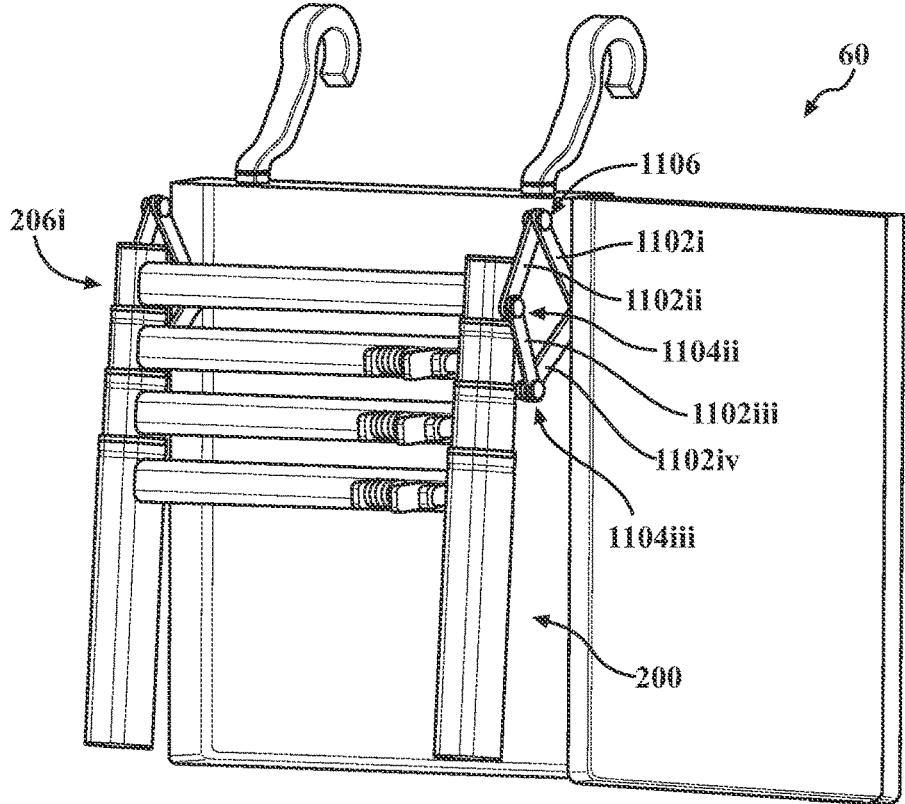
FIG. 25 is a front, perspective view of the ladder assembly seen in FIG. 24 shown in the use configuration and the ladder shown in the collapsed configuration.
Figure 26:
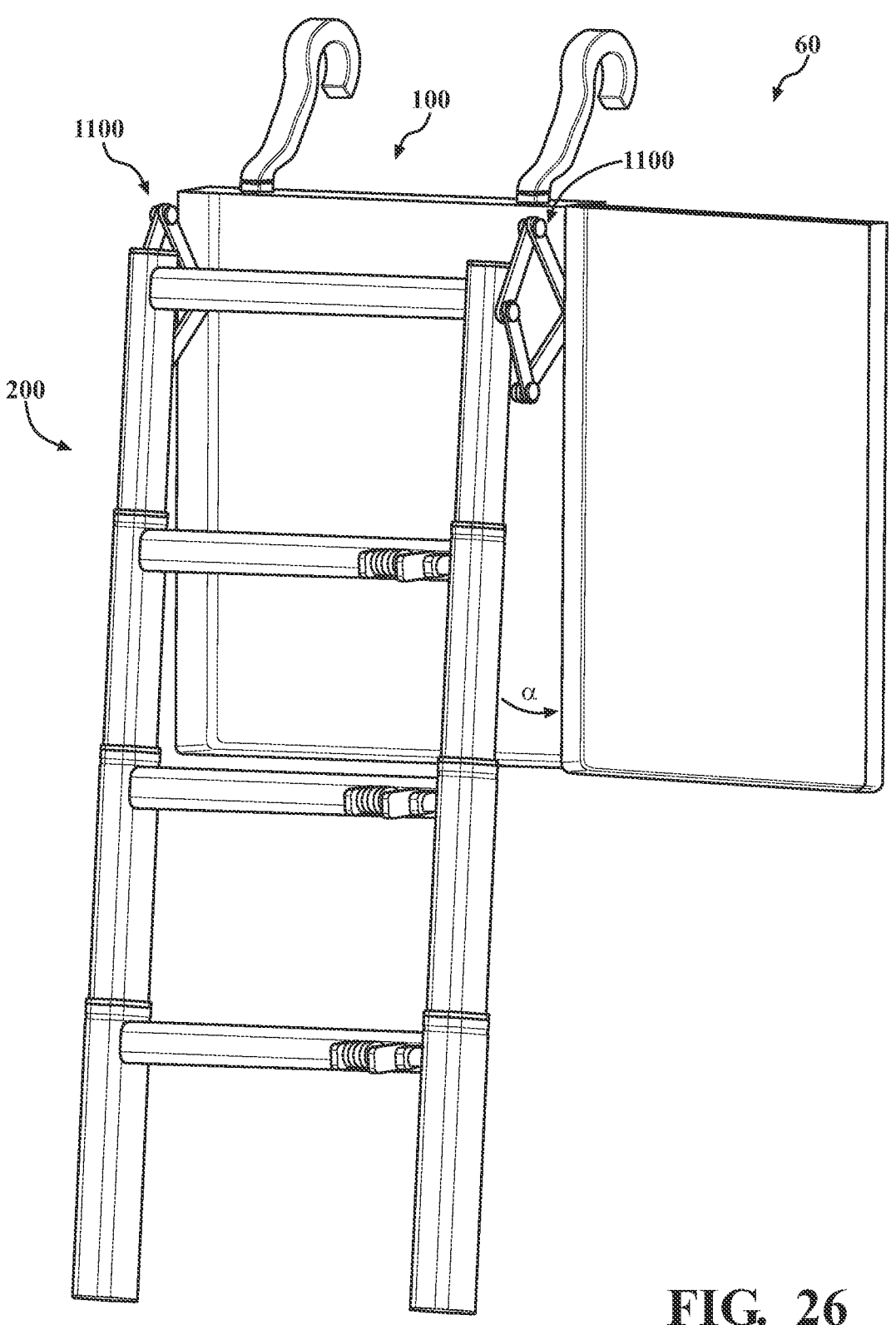
FIG. 26 is a side, perspective view of the ladder assembly seen in FIG. 24 with the ladder shown in the expanded configuration.

The locking mechanism 1106 extends through the links 1102i, 1102ii, which facilitates reconfiguration of the ladder assembly 60 between the storage configuration (FIG. 24) and the use configuration (FIG. 25). The locking mechanism 1106 is reconfigurable between a locked (closed) configuration (FIG. 27), in which the locking mechanism 1106 fixes (maintains) the angular orientation of the ladder 200, and an unlocked (open) configuration (FIG. 28), in which the angular orientation of the ladder 200 can be varied. In the particular embodiment illustrated, the locking mechanism 1106 is reconfigurable between the unlocked and locked configurations via the application of a compressive force thereto. It should be appreciated, however, that the locking mechanism 1106 may be configured in any manner suitable for the intended purpose described herein. For example, embodiments are also envisioned in which the locking mechanism 1106 may instead include a thumbscrew, corresponding nuts and bolts, etc.

It should be appreciated that the locations of the pivot members 1104 and/or the locking mechanism 1106 may be varied in alternate embodiments without departing from the scope of the present disclosure. For example, embodiments in which the locking mechanism 1106 may extend through the links 1102iii, 1102iv are also envisioned herein as are embodiments in which the hinge mechanisms 1100 may be connected to the ladder 200 by the pivot members 1104ii.

With continued reference now to FIGS. 24-28, use and operation of the ladder assembly 60 will be discussed. Following installation of the ladder assembly 60 and opening (removal) of the cover 104, the ladder 200 is removed from the internal cavity 112 via the manual application of a force that is directed outwardly (e.g., away from the vehicle 20). As the ladder 200 exits the internal cavity 112, the ladder 200 is moved from the collapsed configuration (FIGS. 24, 25) into the expanded configuration (FIG. 26), either automatically or manually. Thereafter, the ladder 200 can be oriented as necessary or desired (e.g., by pivoting the ladder 200 so as to vary the angle α and the vertical position (height) of the ladder 200) and the locking mechanisms 1106 can be engaged via the application of a compressive force thereto, which causes movement of the locking mechanisms 1106 into the locked configuration (FIG. 27) to thereby fix the angular orientation (e.g., the angle α) and the vertical position of the ladder 200.

Figures 27, 28:
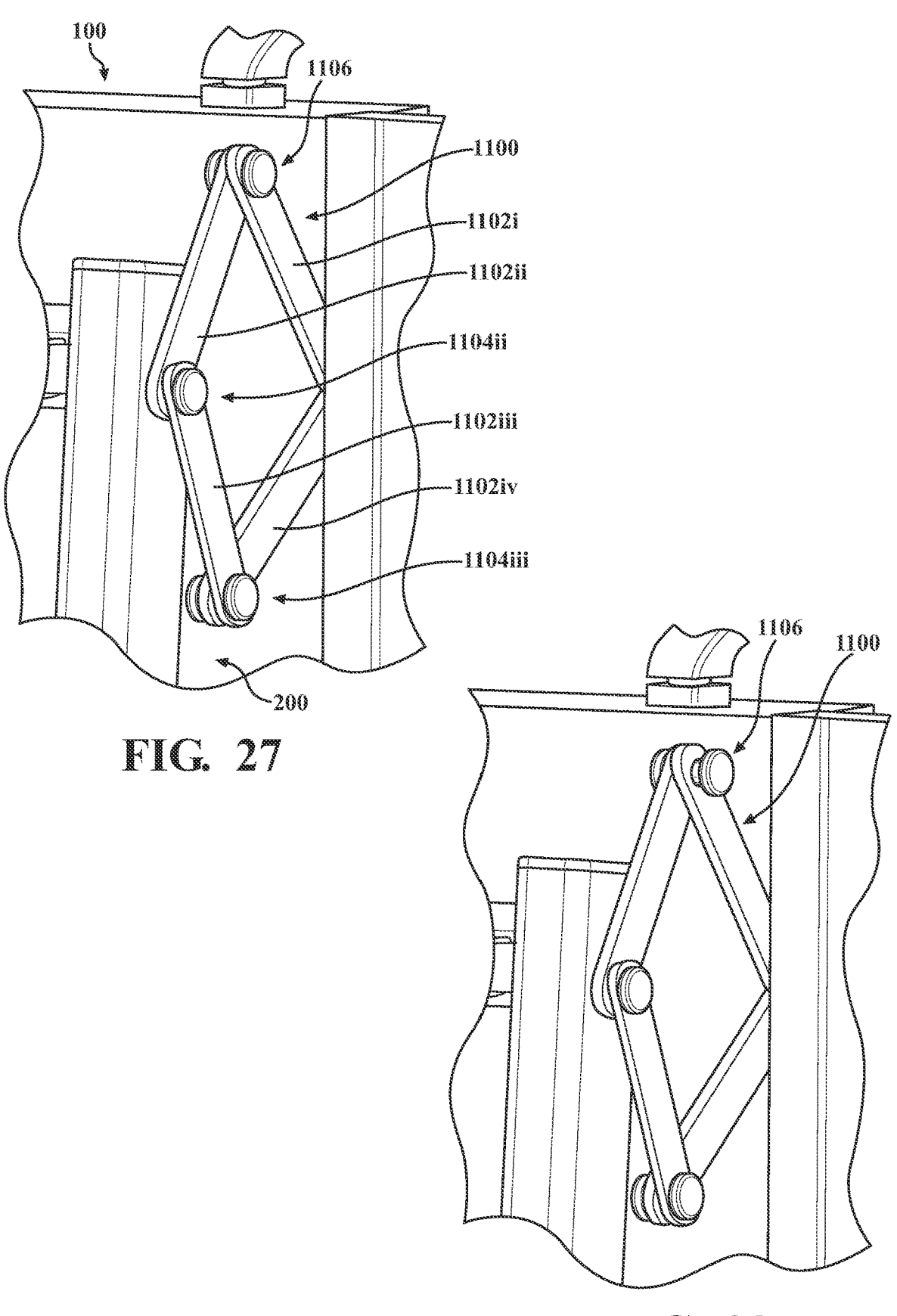
FIG. 27 is a partial, side, perspective view of the ladder assembly seen in FIG. 24 illustrating locking mechanisms on the hinge assemblies shown in a locked configuration.
FIG. 28 is a partial, side, perspective view of the ladder assembly seen in FIG. 24 with the locking mechanisms on the hinge assemblies shown in a locked configuration.

When use of the ladder assembly 60 is no longer required, the locking mechanisms 1106 can be disengaged via the application of a compressive force thereto, which causes movement of the locking mechanisms 1106 into the unlocked configuration (FIG. 28). Thereafter, the ladder assembly 60 can be returned to the storage configuration (FIG. 24) by collapsing the ladder 200, pivoting the ladder 200 inwardly (e.g., towards the vehicle 20), and closing (replacing) the cover 104.

In certain embodiments, the case defines the cover is connected to the housing such that the case is reconfigurable between a closed configuration, in which the cover conceals the internal cavity, and an open configuration, in which the internal cavity is exposed.

In certain embodiments, the ladder is configured for automatic reconfiguration from the collapsed configuration into the expanded configuration upon extension of the ladder from the internal cavity.

In certain embodiments, the internal cavity is exposed when the case is in the open configuration.

In certain embodiments, an uppermost segment of the ladder is directly and pivotably connected to the case about a fixed pivot axis.

In certain embodiments, the ladder is configured for automatic reconfiguration from the collapsed configuration into the expanded configuration upon extension of the ladder from the internal cavity.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward,"

"downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°+25% (e.g., an angle that lies within the range of (approximately) 135° to (approximately)) 225°. The term "generally parallel" should thus be understood as referring to encompass configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A ladder assembly configured for use with a vehicle, the ladder assembly comprising:
   a case defining an internal cavity and including:
      a housing including sidewalls;
      at least one engagement member extending from the housing and configured for releasable engagement with the vehicle such that the ladder assembly is removably connectable thereto; and
      a cover connected to the housing such that the case is reconfigurable between a closed configuration, in which the cover conceals the internal cavity, and an open configuration, in which the internal cavity is exposed; and
   a ladder defining a longitudinal axis and being reconfigurable between a collapsed configuration and an expanded configuration, wherein an uppermost segment of the ladder is directly and pivotably connected to the sidewalls by pivot members extending through the ladder and into the sidewalls such that the ladder is pivotable about a fixed pivot axis to facilitate adjustment in an angular orientation of the ladder.

2. The ladder assembly of claim 1, wherein the pivot members extend transversely in relation to the longitudinal axis.

3. The ladder assembly of claim 1, wherein the ladder assembly is reconfigurable between a storage configuration, in which the ladder is located within the internal cavity, and a use configuration, in which the ladder extends from the internal cavity to facilitate reconfiguration of the ladder from the collapsed configuration into the expanded configuration.

4. The ladder assembly of claim 3, wherein the ladder is configured for automatic reconfiguration from the collapsed configuration into the expanded configuration upon extension of the ladder from the internal cavity.

5. The ladder assembly of claim 3, wherein the ladder is configured for manual reconfiguration from the collapsed configuration into the expanded configuration.

6. The ladder assembly of claim 5, wherein the ladder includes:
   a first segment and a second segment configured for relative axial movement along the longitudinal axis; and
   a latch supported on the first segment, the latch being reconfigurable between an engaged position, in which latch engages the second segment so as to maintain relative axial positioning of the first segment and the second segment, and a disengaged position, in which the latch is disengaged from the second segment so as to permit relative axial movement between the first segment and the second segment.

7. A ladder assembly configured for use with a vehicle, the ladder assembly comprising:
   a case configured for releasable engagement with the vehicle and defining an internal cavity, wherein the case is reconfigurable between a closed configuration, in which the internal cavity is concealed, and an open configuration, in which the internal cavity is exposed;
   a locking mechanism supported by the case, wherein the locking mechanism is slidable along a first axis and rotatable about a second axis extending in generally parallel relation to the first axis; and
   a ladder defining a longitudinal axis and a locking groove configured to receive the locking mechanism, the ladder being telescopically reconfigurable between a collapsed configuration and an expanded configuration.

8. The ladder assembly of claim 7, wherein the ladder assembly includes a pair of locking mechanisms and a pair of locking grooves.

9. The ladder assembly of claim 7, wherein the locking mechanism is repositionable between an unlocked position, in which the locking mechanism is separated from the locking groove such that the ladder is movable in relation to the case, and a locked position, in which the locking mechanism is positioned within the locking groove to inhibit movement of the ladder in relation to the case.

10. The ladder assembly of claim 9, wherein the locking mechanism is slidably repositionable along the first axis between the unlocked position and the locked position, wherein the first axis extends in transverse relation to the longitudinal axis.

11. The ladder assembly of claim 10, wherein the second axis extends in transverse relation to the longitudinal axis.

12. The ladder assembly of claim 9, wherein the locking groove includes:
   a channel extending in generally parallel relation to the longitudinal axis; and
   a slot extending transversely in relation to the channel and configured to receive an anchor of the locking mechanism.

13. The ladder assembly of claim 12, wherein the slot extends along an axis subtending an angle with the longitudinal axis that lies substantially within a range of approximately 5 degrees to approximately 45 degrees.

14. The ladder assembly of claim 7, wherein the case includes:

a housing; and a cover movably connected to the housing to thereby facilitate reconfiguration of the case between the closed configuration and the open configuration.

15. A ladder assembly configured for use with a vehicle, the ladder assembly comprising:

a case defining an internal cavity, wherein the case includes:

a housing; and a cover connected to the housing such that the case is reconfigurable between a closed configuration, in which the cover conceals the internal cavity, and an open configuration, in which the internal cavity is exposed;

a ladder pivotably connected to the case about a fixed pivot axis; and a locking mechanism repositionable between a locked configuration, in which the locking mechanism extends through the ladder and into the case to thereby fix an angular orientation of the ladder, and an unlocked configuration, in which the locking mechanism is separated from the case to allow for adjustment of the angular orientation of the ladder.

16. The ladder assembly of claim 15, further comprising a first pivot member and a second pivot member pivotably connecting the case and the ladder to facilitate adjustment of the angular orientation of the ladder, the second pivot member extending into the locking mechanism.

17. The ladder assembly of claim 15, wherein the locking mechanism is biased towards the locked configuration.

18. The ladder assembly of claim 15, wherein the case includes:

a first locking aperture configured to receive the locking mechanism and thereby fix the ladder in a first angular orientation; and a second locking aperture configured to receive the locking mechanism and thereby fix the ladder in a second angular orientation.

19. The ladder assembly of claim 18, wherein the locking mechanism includes a locking pin configured for removable insertion into the first locking aperture and the second locking aperture.

20. The ladder assembly of claim 18, wherein the second locking aperture is angularly offset from the first locking aperture by an angular distance that lies substantially within a range of approximately 5 degrees to approximately 45 degrees.

* * * * *